United States Patent
Aden et al.

(10) Patent No.: US 11,650,645 B2
(45) Date of Patent: *May 16, 2023

(54) CENTRALIZED ADAPTIVE POWER MANAGEMENT

(71) Applicant: Arista Networks, Inc., Santa Clara, CA (US)

(72) Inventors: Charles Melvin Aden, Berkeley, CA (US); Eudean Michael Sun, Walnut Creek, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,606

(22) Filed: Jul. 2, 2021

(65) Prior Publication Data

US 2021/0333857 A1     Oct. 28, 2021

Related U.S. Application Data

(63) Continuation of application No. 16/236,270, filed on Dec. 28, 2018, now Pat. No. 11,054,875.

(60) Provisional application No. 62/726,304, filed on Sep. 2, 2018.

(51) Int. Cl.
| | |
|---|---|
| *G06F 1/32* | (2019.01) |
| *G06F 1/28* | (2006.01) |
| *G06F 1/30* | (2006.01) |
| *G06F 1/3206* | (2019.01) |
| *H04L 12/10* | (2006.01) |

(Continued)

(52) U.S. Cl.
CPC ............... *G06F 1/28* (2013.01); *G06F 1/30* (2013.01); *G06F 1/3206* (2013.01); *H04L 12/10* (2013.01); *H04L 43/0817* (2013.01); *G05F 1/46* (2013.01)

(58) Field of Classification Search
CPC .................................. G06F 1/32; G06F 9/44
See application file for complete search history.

(56) References Cited

U.S. PATENT DOCUMENTS

| | | |
|---|---|---|
| 7,240,224 B1 | 7/2007 | Biederman |
| 7,478,251 B1 | 1/2009 | Diab et al. |
| 8,676,393 B1 | 3/2014 | Hupton et al. |

(Continued)

OTHER PUBLICATIONS

Related U.S. Appl. No. 17/520,415, filed Nov. 5, 2021.

*Primary Examiner* — Keshab R Pandey
(74) *Attorney, Agent, or Firm* — Fountainhead Law Group P.C.

(57) ABSTRACT

Power management includes receiving power supply unit (PSU) power capacity data and PSU power consumption data from each PSU in a set of PSUs. A priority table is updated with controlled device power consumption data received from a set of controlled devices. If the PSU power consumption data of any PSU exceeds an associated threshold calculated based on the PSU power capacity data for the PSU, then one or more controlled devices are selected based on the controlled device power consumption data in the priority table. When power consumption data of any PSU exceeds the associated threshold, a power response procedure powers off at least one of the selected one or more controlled devices, reduces power supplied to at least one of the selected one or more controlled devices, or reduces an output voltage of any of the PSU for which the PSU power consumption data exceeds the associated threshold.

19 Claims, 13 Drawing Sheets

(51) Int. Cl.
*H04L 43/0817* (2022.01)
*G05F 1/46* (2006.01)

(56) References Cited

U.S. PATENT DOCUMENTS

| | | | |
|---|---|---|---|
| 2004/0268166 A1* | 12/2004 | Farkas | G06F 1/3203 |
| | | | 713/320 |
| 2005/0272402 A1 | 12/2005 | Ferentz et al. | |
| 2006/0133368 A1 | 6/2006 | Tolliver | |
| 2010/0106985 A1 | 4/2010 | Panguluri et al. | |
| 2010/0199113 A1 | 8/2010 | Lee | |
| 2012/0066519 A1 | 3/2012 | El-Essawy et al. | |
| 2013/0201316 A1 | 8/2013 | Binder et al. | |
| 2014/0129856 A1 | 5/2014 | Bertin | |
| 2014/0245031 A1 | 8/2014 | Hamdi et al. | |
| 2015/0067379 A1 | 3/2015 | Tashima | |
| 2015/0121104 A1 | 4/2015 | Kinouchi | |
| 2015/0244834 A1 | 8/2015 | Zuo et al. | |
| 2016/0094350 A1 | 3/2016 | Picard | |
| 2017/0293341 A1 | 10/2017 | Jenne et al. | |
| 2017/0257305 A1 | 12/2017 | Ragupath et al. | |
| 2017/0357305 A1* | 12/2017 | Kunnathur Ragupathi | |
| | | | G06F 1/3206 |
| 2017/0359860 A1* | 12/2017 | Howe | G01R 31/3842 |
| 2018/0032120 A1 | 2/2018 | Maheswaran et al. | |
| 2019/0213700 A1 | 1/2019 | Kobayashi | |
| 2019/0235600 A1 | 8/2019 | Staude et al. | |
| 2020/0073457 A1 | 3/2020 | Aden et al. | |
| 2020/0076626 A1 | 3/2020 | Yam et al. | |
| 2020/0076627 A1 | 3/2020 | Yam et al. | |
| 2020/0076628 A1 | 3/2020 | Yam et al. | |

* cited by examiner

|  | Controlled Device Data Property 1 | Controlled Device Data Property 2 | Controlled Device Data Property 3 |  | Controlled Device Data Property N |
|---|---|---|---|---|---|
| Controlled Device 1 | Controlled Device Data Entry | Controlled Device Data Entry | Controlled Device Data Entry |  | Controlled Device Data Entry |
| Controlled Device 2 | Controlled Device Data Entry | Controlled Device Data Entry | Controlled Device Data Entry |  | Controlled Device Data Entry |
| Controlled Device 3 | Controlled Device Data Entry | Controlled Device Data Entry | Controlled Device Data Entry | • • • | Controlled Device Data Entry |
| ⋮ | | | | | |
| Controlled Device N | Controlled Device Data Entry | Controlled Device Data Entry | Controlled Device Data Entry |  | Controlled Device Data Entry |

Priority Table 400

FIG. 4A

|  | Power Supply Unit (PSU) Data Property 1 | Power Supply Unit (PSU) Data Property 2 | Power Supply Unit (PSU) Data Property 3 |  | Power Supply Unit (PSU) Data Property N |
|---|---|---|---|---|---|
| Power Supply Unit (PSU) 1 | PSU Data Entry | PSU Data Entry | PSU Data Entry |  | PSU Data Entry |
| Power Supply Unit (PSU) 2 | PSU Data Entry | PSU Data Entry | PSU Data Entry |  | PSU Data Entry |
| Power Supply Unit (PSU) 3 | PSU Data Entry | PSU Data Entry | PSU Data Entry | • • • | PSU Data Entry |
| ⋮ | | | | | |
| Power Supply Unit (PSU) N | PSU Data Entry | PSU Data Entry | PSU Data Entry |  | PSU Data Entry |

Power Supply Unit (PSU) Data Table 402

FIG. 4B

|  | Power Consumption [W] | Priority Ranking | User Comments | Temperature [°F] | DC Power Status |
|---|---|---|---|---|---|
| Line Card 1 | 250 | 1 | Critical, do not power off | 90 | Normal |
| Fan | 25 | 2 | For Line Card 1 |  | Normal |
| Passive Supervisor | 250 | 3 | Entirely redundant | 75 | Normal |
| Plurality of Line Cards | 300 | 4 |  | 88 | Normal |
| Network Chip | 150 | 5 | Lowest priority, power off first | 106 | Normal |

Priority Table 1000

FIG. 10A

|  | Maximum Possible Power Capacity [W] | Power Threshold [W] | Instant Power Output [W] | AC Status | DC Status | Output Voltage |
|---|---|---|---|---|---|---|
| Power Supply Unit (PSU) 1 | 3000 | 2600 | 2553 | Normal | Normal | 12.0 |
| Power Supply Unit (PSU) 2 | 3000 | 2850 | 2900 | Normal | Normal | 12.2 |
| Power Supply Unit (PSU) 3 | 2500 | 2450 | 1600 | Normal | Error | 12.1 |
| Power Supply Unit (PSU) 4 | 3500 | 3250 | 500 | Error | Normal | 12.1 |

Power Supply Unit (PSU) Data Table 1002

FIG. 10B

|  | Power Consumption [W] | Priority Ranking | User Comments | Temperature [°F] | DC Power Status |
|---|---|---|---|---|---|
| Line Card 1 | 250 | 1 | Critical, do not power off | 90 | Normal |
| Fan | 50 | 2 | For Line Card 1 |  | Normal |
| Passive Supervisor | 250 | 3 | Entirely redundant | 75 | Normal |
| Plurality of Line Cards | 300 | 4 |  | 88 | Normal |
| Network Chip | 150 | 5 | Lowest priority, power off first | 106 | Normal |
| Priority Table 1100 | | | | | |

FIG. 11A

|  | Maximum Possible Power Capacity [W] | Power Threshold [W] | Instant Power Output [W] | AC Status | DC Status | Output Voltage |
|---|---|---|---|---|---|---|
| Power Supply Unit (PSU) 1 | 3000 | 2900 | 2905 | Normal | Normal | 12.3 |
| Power Supply Unit (PSU) 2 | 3000 | 2900 | 2850 | Normal | Normal | 12.1 |
| Power Supply Unit (PSU) 3 | 3000 | 2900 | 2880 | Normal | Normal | 12.2 |
| Power Supply Unit (PSU) 4 | 3000 | 2900 | 2850 | Normal | Normal | 12.1 |
| Power Supply Unit (PSU) Data Table 1102 | | | | | | |

FIG. 11B

|  | Power Consumption [W] | Priority Ranking | User Comments | Temperature [°F] | DC Power Status |
|---|---|---|---|---|---|
| Line Card 1 | 680 | 1 | Critical, do not power off | 150 | Normal |
| Fan | 75 | 2 | For Line Card 1 |  | Normal |
| Passive Supervisor | 250 | 3 | Entirely redundant | 75 | Normal |
| Plurality of Line Cards | 800 | 4 |  | 135 | Normal |
| Network Chip | 700 | 5 | Lowest priority, power off first | 106 | Normal |
| Priority Table 1200 ||||||

FIG. 12A

|  | Maximum Possible Power Capacity [W] | Power Threshold [W] | Instant Power Output [W] | AC Status | DC Status | Output Voltage |
|---|---|---|---|---|---|---|
| Power Supply Unit (PSU) 1 | 5000 | 4900 | 4999 | Normal | Normal | 12.0 |
| Power Supply Unit (PSU) 2 | 5000 | 4900 | 4999 | Normal | Normal | 12.2 |
| Power Supply Unit (PSU) 3 | 5000 | 4900 | 4999 | Normal | Normal | 12.1 |
| Power Supply Unit (PSU) 4 | 5000 | 4900 | 4999 | Error | Normal | 12.1 |
| Power Supply Unit (PSU) Data Table 1202 |||||||

FIG. 12B

|  | Power Consumption [W] | Priority Ranking | User Comments | Temperature [°F] | DC Power Status |
|---|---|---|---|---|---|
| Line Card 1 | 680 | 1 | Critical, do not power off | 150 | Normal |
| Fan | 50 | 2 | For Line Card 1 |  | Normal |
| Passive Supervisor | 250 | 3 | Entirely redundant | 75 | Normal |
| Plurality of Line Cards | 2600 | 4 |  | 135 | Normal |
| Network Chip | 200 | 5 | Lowest priority, power off first | 106 | Normal |
| Previous Priority Table 1300 | | | | | |

FIG. 13A

|  | Maximum Possible Power Capacity [W] | Power Threshold [W] | Instant Power Output [W] | AC Status | DC Status | Output Voltage |
|---|---|---|---|---|---|---|
| Power Supply Unit (PSU) 1 | 2000 | 1950 | 2700 | Error | Error | 12.0 |
| Power Supply Unit (PSU) 2 | 2000 | 1950 | 3000 | Error | Error | 12.2 |
| Power Supply Unit (PSU) 3 | 2000 | 1950 | 2650 | Error | Error | 12.1 |
| Previous Power Supply Unit (PSU) Data Table 1302 | | | | | | |

FIG. 13B

CENTRALIZED ADAPTIVE POWER MANAGEMENT

CROSS REFERENCE TO RELATED APPLICATIONS

This patent application is a Continuation of U.S. patent application Ser. No. 16/236,270, filed on Dec. 28, 2018, which claims the benefit of U.S. Provisional Patent Application No. 62/726,304 filed on Sep. 2, 2018 under 35 U.S.C. § 119(e), each of which is incorporated herein by reference in its entirety.

BACKGROUND

Devices are often powered by two or more power supply units. In certain situations, failure (e.g., loss of power) of one or more of the power supply units may cause problems with the other power supply units. For example, the power load on the other power supply units may increase. Such an increase may overload one or more of the other power supplies.

SUMMARY

In general, in one aspect, embodiments of the invention relate to a method for power management. The method may include receiving first power supply unit (PSU) capacity data and first PSU consumption data from a first PSU to a supervisor; storing, via the supervisor, the first PSU capacity data and the first PSU consumption data in storage; receiving first controlled device power consumption data from a first controlled device to the supervisor; updating a priority table, stored in the storage, with the first controlled device power consumption data; making a first determination that the first PSU consumption data exceeds a first threshold, where, the first threshold is calculated based on at least the first PSU capacity data; and based on the first determination, initiating a power response procedure.

In general, in one aspect, embodiments of the invention relate to a non-transitory computer readable medium including instructions that, when executed by a processor, perform a method for power management. The method may include receiving first power supply unit (PSU) capacity data and first PSU consumption data from a first PSU to a supervisor; storing, via the supervisor, the first PSU capacity data and the first PSU consumption data in storage; receiving first controlled device power consumption data from a first controlled device to the supervisor; updating a priority table, stored in the storage, with the first controlled device power consumption data; making a first determination that the first PSU consumption data exceeds a first threshold, where, the first threshold is calculated based on at least the first PSU capacity data; and based on the first determination, initiating a power response procedure.

In general, in one aspect, embodiments of the invention relate to a system for power management. The system may include a supervisor that includes circuitry and is configured to receive first power supply unit (PSU) capacity data and first PSU consumption data from a first PSU to a supervisor; store, via the supervisor, the first PSU capacity data and the first PSU consumption data in storage; receive first controlled device power consumption data from a first controlled device to the supervisor; update a priority table, stored in the storage, with the first controlled device power consumption data; make a first determination that the first PSU consumption data exceeds a first threshold, where, the first threshold is calculated based on at least the first PSU capacity data; and based on the first determination, initiate a power response procedure.

Other aspects of the invention will be apparent from the following description and the appended claims.

BRIEF DESCRIPTION OF DRAWINGS

FIG. 4A shows a table in accordance with one or more embodiments of the invention.

FIG. 4B shows a table in accordance with one or more embodiments of the invention.

FIG. 10A shows an example in accordance with one or more embodiments of the invention.

FIG. 10B shows an example in accordance with one or more embodiments of the invention.

FIG. 11A shows an example in accordance with one or more embodiments of the invention.

FIG. 11B shows an example in accordance with one or more embodiments of the invention.

FIG. 12A shows an example in accordance with one or more embodiments of the invention.

FIG. 12B shows an example in accordance with one or more embodiments of the invention.

FIG. 13A shows an example in accordance with one or more embodiments of the invention.

FIG. 13B shows an example in accordance with one or more embodiments of the invention.

DETAILED DESCRIPTION

Figure 1:
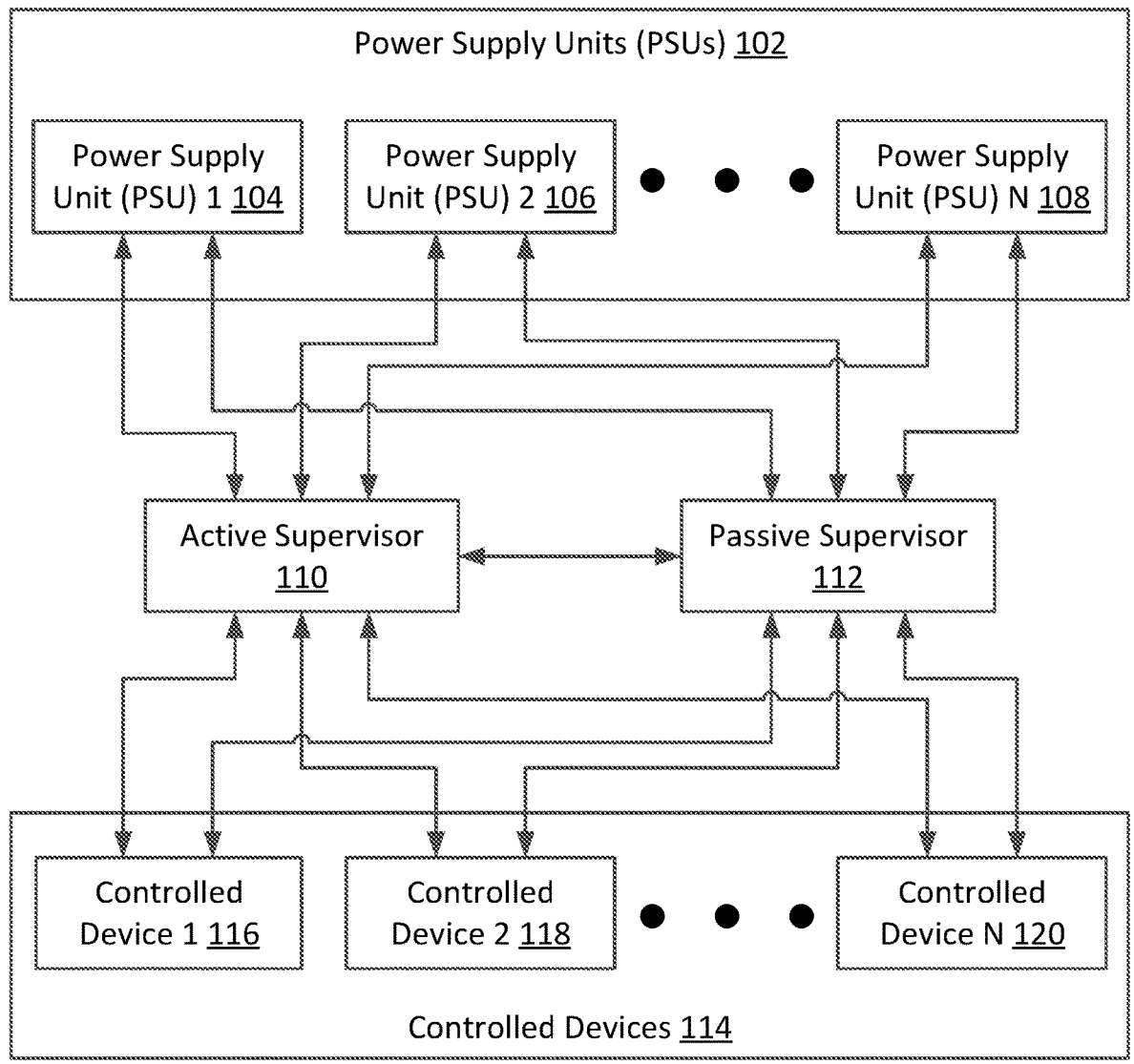
FIG. 1 shows a system in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to methods and systems for power management. Specifically, in one or more embodiments of the invention, a supervisor maintains a table of controlled devices and their respective power consumption. Further, in one or more embodiments of the invention, the supervisor receives data from power supply units (PSUs) regarding available power capacity and current power consumption of the PSUs. As an intermediate device between the PSUs and the controlled devices, the supervisor may be used to manage which components of a system receive power and, in the event of a power disruption, perform one or more actions to maintain the supply of power to all, or a portion of, the components of the system.

In one or more embodiments of the invention, the supervisor includes functionality to detect that a PSU has surpassed a power threshold, and is thus in danger of failing. In response to that determination, the supervisor includes functionality to perform one or more tasks to reduce power consumption (e.g., of one or more controlled devices) and/or shift power consumption between PSUs in order to keep the system, or some part of the system, operational.

FIG. 1 shows a system in accordance with one or more embodiments of the invention. In one or more embodiments of the invention, the system includes an active supervisor (110), a passive supervisor (112), power supplies units (PSUs) (102), and controlled devices (114). As shown in FIG. 1, the PSUs (102) include PSU 1 (104), PSU 2 (106), and PSU N (108), and the controlled devices (114) include controlled device 1 (116), controlled device 2 (118), and controlled device N (120). Each of these components is described below.

In one or more embodiments of the invention, a PSU (e.g., PSU 1 (104), PSU 2 (106), PSU N (108)) is a device that provides power to one or more other devices. In one or more embodiments of the invention, a PSU (e.g., PSU 1 (104), PSU 2 (106), PSU N (108)) includes one or more power inputs for receiving power from an external source, and one or more power outputs for providing power to other devices. For example, a PSU (104, 106, 108) may receive power via alternating current (AC) at a power input, convert the AC to direct current (DC), and provide, via the DC, power to any one or more of devices. Additionally, in one or more embodiments of the invention, a PSU may regulate the amount of power transmitted by adjusting the amount of current and/or voltage transmitted and/or may terminate power, if so instructed.

In one or more embodiments of the invention, a controlled device (e.g., controlled device 1 (116), controlled device 2 (118), controlled device N (120)) is any hardware (e.g., circuitry) and/or combination of hardware and software that includes functionality to perform all or any portion of any functionality of a computing device (e.g., a modular network device). In one or more embodiments of the invention, a controlled device (e.g., controlled device 1 (116), controlled device 2 (118), controlled device N (120)) is included in a computing device and/or may be operatively connected to a computing device. As used herein, the phrase 'operatively connected' refers to any direct (e.g., wired directly between two devices) or indirect (e.g., wired and/or wireless connections between any number of devices connecting the operatively connected devices) connection.

In one or more embodiments of the invention, a computing device is any device or any set of devices capable of electronically processing instructions and may include, but is not limited to, any of the following: one or more processors, memory (e.g., random access memory (RAM)), input and output device(s), persistent storage, one or more physical interfaces (e.g., network ports), any number of other hardware components (not shown) (e.g., light emitting diodes (LEDs), optical transceivers, network chips, etc.) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) and/or any other type of computing device with the aforementioned requirements.

In one or more embodiments of the invention, a controlled device (e.g., controlled device 1 (116), controlled device 2 (118), controlled device N (120)) is any single device, any component of a device, any aggregate of devices, any aggregate of components of a device, or any aggregate of components of multiple devices. Thus, as used herein, multiple devices and/or components may collectively be termed a "controlled device".

Examples of a controlled device (e.g., controlled device 1 (116), controlled device 2 (118), controlled device N (120)) include, but are not limited to, a switch, a line card, a fabric card, an individual port on line card, a central processing unit (CPU), a system control device (SCD), a supervisor (described below), a PSU (e.g., PSU 1 (104), PSU 2 (106), PSU N (108)), a network chip, a router, an access point, a computing device, a fan, an optical transceiver, a light emanating device (e.g., a LED), a Power Over Ethernet (POE) port and/or device, any multiple of these devices, or any other device(s) that may be powered by a PSU (e.g., PSU 1 (104), PSU 2 (106), PSU N (108)). As another example, a controlled device (e.g., controlled device 1 (116), controlled device 2 (118), controlled device N (120)) may be an aggregation of multiple components of two or more devices (e.g., various display indicator LEDs of multiple devices). Further, an SCD may be a device that interacts with software (e.g., agents) and provides the ability to control any type of component of the system.

In one or more embodiments of the invention, a supervisor (e.g., active supervisor (110), passive supervisor (112)) is any hardware (e.g., circuitry), software, firmware, and/or combination thereof that includes functionality to receive power information (e.g., from PSUs (102), controlled devices (114), etc.) and/or perform one or more actions related to power in a computing device (e.g., interacting with PSUs (102), interacting with controlled devices (114), storing power related information, sending messages in response to power conditions, etc.). In one or more embodiments of the invention, a supervisor includes functionality to receive, organize, interpret, store, and/or take one or more actions in response to information regarding devices (e.g., PSUs (102), controlled devices (114)) to which it is operatively connected. Further, in one or more embodiments of the invention, a supervisor may be able to send commands to any device to which it is operatively connected.

Examples of a supervisor include, but are not limited to, software, a SCD, any one or more integrated circuits (ICs), a field programmable gate array (FPGA), an application specific integrated circuit (ASIC), a microcontroller, any device capable of being programmed with device logic and/or capable of executing instructions for performing various operations, and/or any combinations thereof.

Additionally, as shown in FIG. 1, each supervisor (110, 112) may independently operatively connect to each PSU (104, 106, 108) and/or to each controlled device (116, 118, 120). Further, the active supervisor (110) and the passive supervisor (112) may be operatively connected to each other. The operative connections between each supervisor (110, 112), each PSU (104, 106, 108), and each controlled device (116, 118, 120) may occur over a single wire, any multiple of wires, and/or wirelessly. One of ordinary skill in the art and having the benefit of this Detailed Description would appreciate that any form of suitable communication between the supervisors (110, 112), the PSUs (104, 106, 108), and the controlled devices (116, 118, 120) may be employed. Further, each supervisor (110,112) may not be connected to each PSU (104, 106, 108) and/or each controlled device (116, 118, 120) independently. Rather, the supervisors (110, 112) may share connections between each PSU (104, 106, 108) and/or each controlled device (116, 118, 120). Additionally, certain controlled devices (116, 118, 120) and/or PSUs (104, 106, 108) may be connected to only one supervisor (e.g., active supervisor (110)), while other controlled devices (116, 118, 120) and/or PSUs (104, 106, 108) may be connected to another supervisor (e.g., passive supervisor (112)).

In one or more embodiments of the invention, the active supervisor (110) and the passive supervisor (112) are operatively connected to enable communication between the two supervisors (110, 112). Further, as each supervisor (110, 112) may be independently connected to each controlled device (116, 118, 120) and each PSU (104, 106, 108), each supervisor (110, 112) may independently collect data from each controlled device (116, 118, 120) and each PSU (104, 106, 108), respectively. Therefore, for example, if the communication between the active supervisor (110) and any one particular controlled device (116, 118, 120) or PSU (104, 106, 108) becomes severed (or the data transmitted therein becomes otherwise unreadable) the active supervisor (110) may then be able to query the passive supervisor (112) to obtain that missing or corrupt data. Conversely, the passive supervisor (112) may be able to query the active supervisor (110) to obtain any data that is missing, unavailable, or otherwise corrupt.

In one or more embodiments of the invention, a supervisor (110, 112) having and/or receiving power related information regarding both PSUs (102) and controlled devices (114) allows power to controlled devices (114) and/or distribution of power load among PSUs (102) to be as granular, selective, or comprehensive as desired, or as the system otherwise requires.

In one or more embodiments of the invention, a system such as that shown in FIG. 1, also includes software and/or firmware stored in any data repository (not shown) and/or memory (not shown) (i.e., non-transitory computer readable mediums). Such software and/or firmware may include instructions which, when executed by the one or more processors (not shown) of the system, cause the one or more processors to perform operations in accordance with one or more embodiments of the invention. The instructions may be in the form of computer readable program code to perform embodiments of the invention, and may be stored, in whole or in part, temporarily or permanently, on a non-transitory computer readable medium such as optical media (e.g., compact disc (CD), digital versatile disc (DVD), etc.), magnetic storage (e.g., hard disk drive (HDD), floppy disk, tape, diskette, etc.), integrated circuit storage (e.g., flash memory, solid-state drive (SSD), etc.), storage device, physical memory, or any other computer readable storage medium.

While FIG. 1 shows a configuration of components, other configurations may be used without departing from the scope of the invention. For example, although PSUs (102) is displayed with only three PSUs (PSU 1 (104), PSU 2 (106), and PSU N (108)), one of ordinary skill in the art and having the benefit of this Detailed Description would appreciate that there can be any number of PSUs in the disclosed system to provide power. Similarly, although controlled devices (114) is shown with only three distinct devices, controlled device 1 (116), controlled device 2 (118), and controlled device N (120), one of ordinary skill in the art and having the benefit of this Detailed Description would appreciate that there can be any number of controlled devices in the disclosed system. As another example, although FIG. 1 shows an active supervisor (110) and a passive supervisor (112), there may be only one supervisor, or more than two supervisors, in the system. Accordingly, embodiments disclosed herein should not be limited to the configuration of components shown in FIG. 1.

Figure 2:
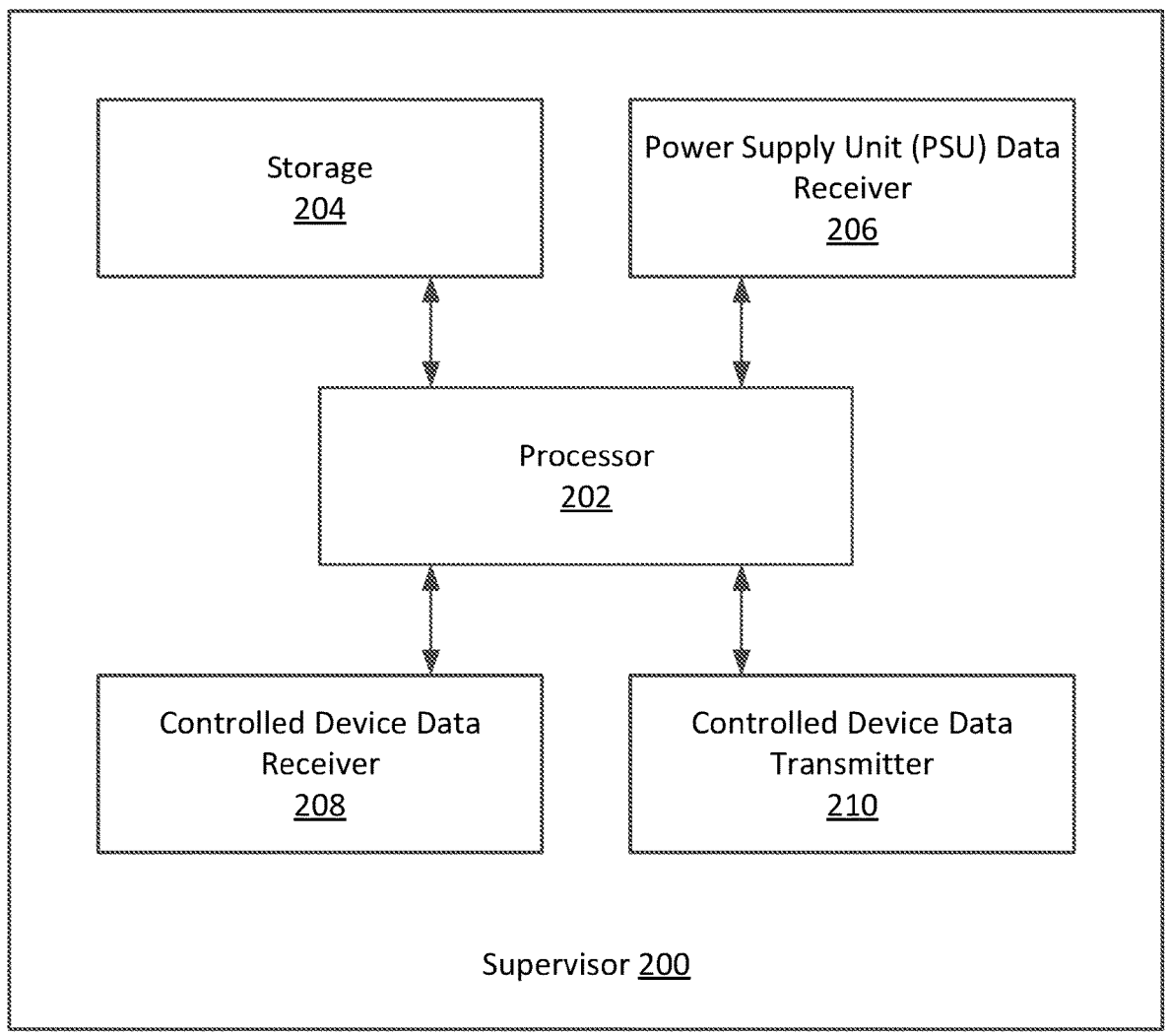
FIG. 2 shows a system in accordance with one or more embodiments of the invention.

FIG. 2 shows a supervisor in accordance with one or more embodiments of the invention. As shown in FIG. 2, a supervisor (200) includes a processor (202), storage (204), a power supply unit (PSU) data receiver (206), a controlled device data receiver (208), and a controlled device data transmitter (210). Each of these components is described below.

In one or more embodiments of the invention, a processor (e.g., processor (202)) is any electrical circuit or set of electrical circuits capable of processing data by performing operations on that data. In one or more embodiments of the invention, a processor (e.g., processor (202)) includes, but is not limited to, an input for receiving data, an output for transmitting processed data, a control unit for extracting instructions, an arithmetic logic unit for performing operations, and a memory component which may further include read-only memory (ROM), random access memory (RAM), and/or cache. Additionally or alternatively, any one or more of the aforementioned components may be operatively connected to rather than included in a processor. As an example, a processor (202) may receive data via any input, store that data internally, perform a set of operations on that data, and then transmit the processed data via an output of the processor (202). As another example, the processor (202) may be all or any portion of an array of configurable logic blocks of an FPGA.

In one or more embodiments of the invention, storage (e.g., storage (204)) is a data repository. In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the storage (204) includes all or any portion of the persistent and/or non-persistent storage of a supervisor (200). In one or more embodiments of the invention, the storage (204) is operatively connected to the processor (202).

In one or more embodiments of the invention, storage (204) includes, but is not limited to, an input for receiving data, an output for transmitting data, and a computer-readable medium capable of retaining data for use at a later time. For example, the storage (204) may receive data from the processor (202), store that data for any duration of time, and, if so requested, transmit that data back to the processor (202). Additionally, although not shown in FIG. 2, the storage may receive data directly from any input, without first passing through the processor (202). The storage (204) may also be part of the processor (202). Further, although FIG. 2 discloses the storage (204) as a component of the supervisor (200), one of ordinary skill in the art and having the benefit of this Detailed Description would appreciate that the storage (204) may be located on any other device directly or indirectly connected to the supervisor (200) and is not necessarily a component thereof.

In one or more embodiments of the invention, a power supply unit (PSU) data receiver (206) is a device that receives data from one or more operatively connected PSUs (not shown) and transmits such data to a processor (202) and/or storage (204). In one or more embodiments of the invention, a PSU data receiver (206) includes one or more inputs (e.g., ports/interfaces) that allow for the receipt of communications from PSUs, and one or more outputs (e.g., ports/interfaces) to send the PSU data. For example, a PSU data receiver (206) may receive PSU data via an input and then transmit said PSU data, via an output, to the processor (202). As another example, the PSU data receiver (206) may include any one or more input ports of an FPGA.

In one or more embodiments of the invention, a controlled device data receiver (208) is a device that receives data from one or more operatively connected controlled devices (not shown) and transmits such data to a processor (202) and/or storage (204). In one or more embodiments of the invention, a controlled device data receiver (208) includes one or more inputs (e.g., ports/interfaces) that allow for the receipt of communications from controlled devices, and one or more outputs (e.g., ports/interfaces) to send the controlled device data. For example, a controlled device data receiver (208) may receive controlled device data via an input and then transmit said controlled device data, via an output, to the processor (202). As another example, the controlled device data receiver (208) may include any one or more input ports of an FPGA.

In one or more embodiments of the invention, a controlled device data transmitter (210) is a device that transmits data (e.g., commands and/or messages) from a processor (202) and/or storage (204) to one or more controlled devices (not shown). In one or more embodiments of the invention, a controlled device data transmitter (210) includes one or more inputs (e.g., ports/interfaces) that allow for the receipt of communications from a processor (202) and/or storage (204), and one or more outputs (e.g., ports/interfaces) to send the communications. For example, a controlled device data transmitter (210) may receive a power off command from the processor (202), via an input, and then transmit said power off command, via an output, to a controlled device (not shown). As another example, the controlled device data transmitter (210) may include any one or more input and/or output ports of an FPGA.

Although not shown, in one or more embodiments of the invention, a power supply unit (PSU) data transmitter is present in the supervisor (200). In one or more embodiments of the invention, the PSU data transmitter is a device that transmits data (e.g., commands and/or messages) from a processor (202) and/or storage (204) to one or more PSUs (not shown). In one or more embodiments of the invention, a PSU data transmitter includes one or more inputs (e.g., ports/interfaces) that allow for the receipt of communications from a processor (202) and/or storage (204), and one or more outputs (e.g., ports/interfaces) to send the communications. For example, a PSU data transmitter may receive a command from the processor (202), via an input, and then transmit said command, via an output, to a PSU (not shown). As another example, the PSU data transmitter (not shown) may include any one or more input and/or output ports of an FPGA.

In one or more embodiments of the invention, the PSU data receiver (206) and the PSU data transmitter (not shown) exist as a single PSU data transceiver capable of performing all of the functions of both the PSU data receiver (206) and the PSU data transmitter (not shown), as described above. Similarly, in one or more embodiments of the invention, the controlled device data receiver (208) and the controlled device data transmitter (210) exist as a single controlled device data transceiver capable of performing all of the functions of both the controlled device data receiver (208) and the controlled device data transmitter (210), as described above. In one or more embodiments of the invention, all or any portions of the components of the supervisor (200) are implemented as portions of one or more FPGAs.

In one or more embodiments of the invention, the operative connections between the processor (202), the storage (204), the PSU data receiver (206), the controlled device data receiver (208), and the controlled device data transmitter (210) may occur over a single wire, any multiple of wires, and/or wirelessly. One of ordinary skill in the art and having the benefit of this Detailed Description would appreciate that any form of suitable communication between the processor (202), the storage (204), the PSU data receiver (206), the controlled device data receiver (208), and the controlled device data transmitter (210) may be employed.

While FIG. 2 shows a configuration of components, other configurations may be used without departing from the scope of the invention. For example, although the storage (204), the PSU data receiver (206), the controlled device data receiver (208), and the controlled device data transmitter (210) are each shown to connect only to the processor (202), one of ordinary skill in the art and having the benefit of this Detailed Description would appreciate that each device may separately and independently connect to each other device thereby allowing communication without passing through the processor (202). Additionally, one of ordinary skill in the art and having the benefit of this Detailed Description would appreciate that any individual component of the supervisor (200) may be located outside of the supervisor (200) and/or part of another device; for example, as previously described, storage (204) may be located outside the supervisor. Further, as described in FIG. 1 above, the supervisor (200) may be software executing on one or more processors, in which case, the various components of FIG. 2 show the various aspects of the functionality of the supervisor. Accordingly, embodiments disclosed herein should not be limited to the configuration of components shown in FIG. 2.

Figure 3:
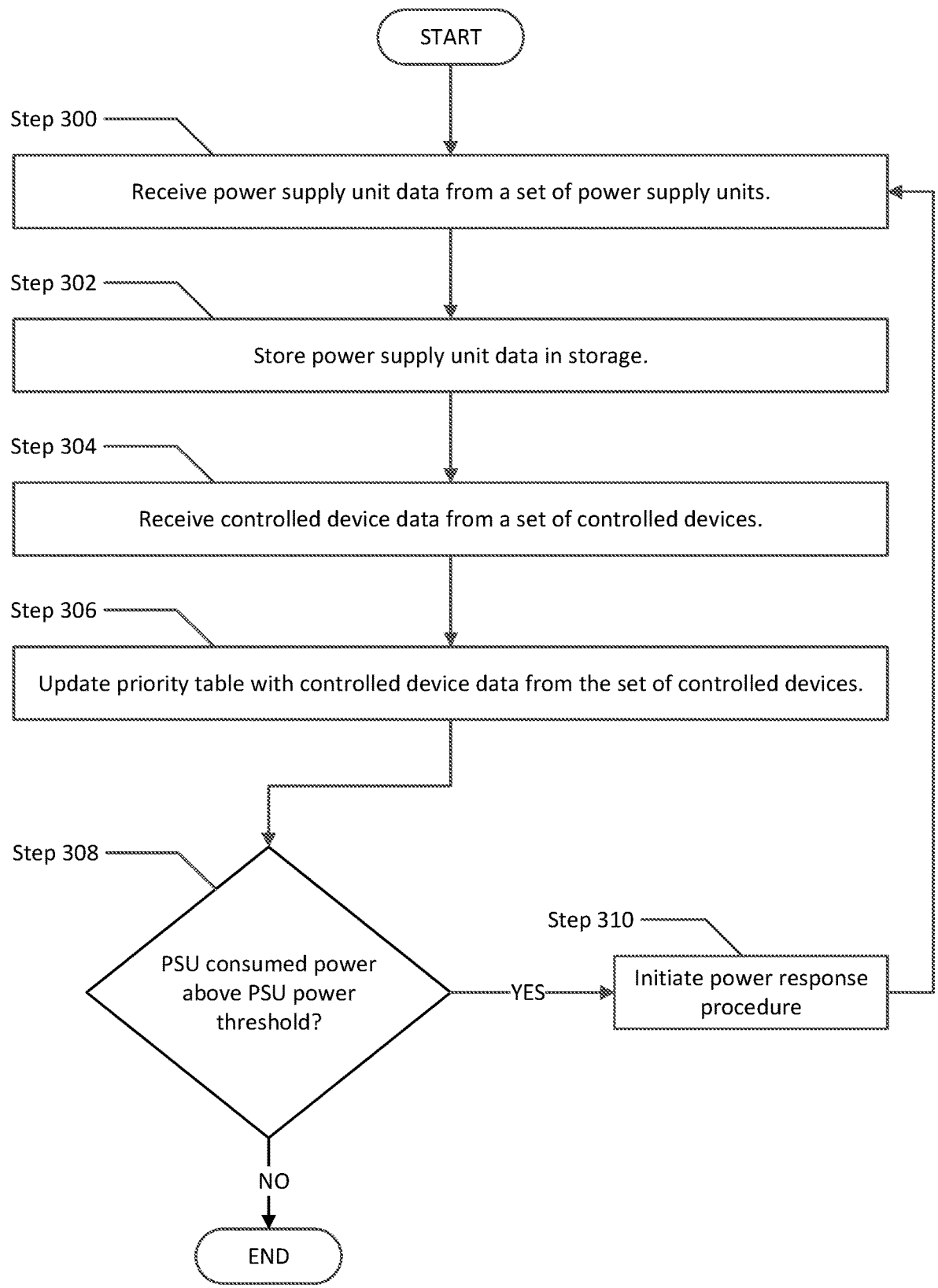
FIG. 3 shows a flowchart in accordance with one or more embodiments of the invention.

FIG. 3 shows a flowchart describing a method for receiving, organizing, and analyzing PSU and controlled device data according to one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In Step 300, the supervisor receives PSU data from each PSU. In one or more embodiments of the invention, the PSU data is received via an operative connection between the PSUs and a PSU data receiver of the supervisor. For example, information may be received from a PSU via a single wire carrying an information signal that is adjusted, modulated, etc. to convey information.

In one or more embodiments of the invention, PSU data relates to power capacity, power consumption, available power capacity, data related to which controlled devices each PSU is powering, power threshold, temperature, AC power status, DC power status, input line voltage, and/or any other data. In one or more embodiments of the invention, the PSU capacity data and/or the PSU power consumption data may relate to the total power consumption data for each individual PSU and/or the aggregate power consumption for two or more PSUs.

In one or more embodiments of the invention, although a PSU may be able to handle a certain maximum power output continuously (e.g., 2,000 W), that PSU may additionally be able to handle surges in power above that maximum (e.g., 4,000 W) for brief periods of time (e.g., "surge window", 500 μs). In one or more embodiments of the invention, PSU data is transmitted from each PSU to a supervisor at time intervals that are less than such a surge window. Accordingly, it may be possible for the supervisor to respond to undesirable power conditions more rapidly and thereby avert a total or partial system shut down. Thus, as data may be transmitted from the PSU to a supervisor in shorter periods of time (e.g., 100 μs, with 3 μs latency), the supervisor may have data related to power surges within the surge window for the PSU and may thus respond appropriately.

In Step 302, the PSU data received in Step 300 is stored in storage. In one or more embodiments of the invention, the storage may include a data structure for the PSU data. For example, PSU data may be organized into a table that includes a row for each individual PSU, and the supervisor may write the received PSU data into respective columns for each PSU. One example of such a table is the PSU data table (402) shown in FIG. 4B. Although such a table may have the same number of columns for each PSU row, at least some of the PSU rows may not have data in all columns. One of ordinary skill in the art and having the benefit of this Detailed Description would appreciate that any form of organization may be employed to store and organize the data.

In Step 304, the supervisor receives controlled data from one or more controlled devices. In one or more embodiments of the invention, the controlled device data is received via an operative connection between the controlled devices and a controlled device data receiver of the supervisor.

The controlled device data may contain, but is not limited to, power consumption, voltage, current, temperature, AC power status, DC power status, associated PSUs, or any other data. Power consumption data for a controlled device may be referred to as controlled device power consumption data. In one or more embodiments of the invention, controlled device data for certain controlled devices may be known and/or easily estimated by each supervisor without having to receive the controlled device data from the controlled device. For example, for certain controlled devices (i.e. a fan, an LED), the specifications regarding much of the controlled device data may be known, assumed accurate, and/or relatively constant. Thus, using the known specifications and/or estimated data of such controlled devices, the controlled device data may be assumed without communication from those controlled devices.

As discussed above, a PSU may be able to operate over its rated power capacity for a brief time that may be referred to as a surge window. In one or more embodiments of the invention, controlled device data is transmitted from each controlled device to a supervisor at time intervals less than the time of such a surge window. Accordingly, it may be possible for the supervisor to respond to unfavorable power conditions more rapidly and thereby avert a total or partial system shut down. Thus, as data may be transmitted from a controlled device to a supervisor in shorter periods of time (e.g., 100 μs, with 3 μs latency), the supervisor may have data related to what is causing a power surge prior to a forced power failure.

In Step 306, the power consumption data for each controlled device is stored in storage. In one or more embodiments of the invention, the storage may contain a data structure for the controlled device data. For example, controlled device data may be organized into a priority table, where the table may reserve a row for all or some controlled devices and then input each individual controlled device's controlled device data into respective columns for that controlled device. One example of such a priority table is the priority table (400) shown in FIG. 4A. Although such a table may have the same number of columns for each controlled device row, at least some of the controlled device rows may not have data in all columns. One of ordinary skill in the art and having the benefit of this Detailed Description would appreciate that any form of organization may be employed to store and organize the data. Further, in one or more embodiments of the invention, the table in which the PSU data is stored is the same as the table in which the controlled device data is stored.

In one or more embodiments of the invention, the priority table contains a column for each of the controlled device data collected from the controlled devices in Step 304. That is, each controlled device is provided a unique row across which all relevant data may be stored in the columns spanning that row. For example, there may be a separate column for power consumption, voltage, current, temperature, AC power status, DC power status, associated PSUs, or any other data. Additionally, the priority table may contain a column used to provide a unique description or identifier to each controlled device, a priority ranking, and/or a comment section for plain text entry.

In one or more embodiments of the invention, the priority table may contain a list of some or all controlled devices and their respective data. Further, a user of the system may access the priority table to view the status of all of the controlled devices and further provide input in appropriate cells including, but not limited to, a priority column, a comment column, or an assumed/estimated controlled device data cell.

In one or more embodiments of the invention, the priority table may contain some mechanism for prioritizing the controlled devices listed therein. Such prioritization may be accomplished by an explicit manual ordering of the devices in the table, or a separate column indicating a relative priority of the controlled devices (e.g., using numerals). One of ordinary skill in the art and having the benefit of this Detailed Description would appreciate that any method or combination of methods for prioritizing controlled devices could be implemented without departing from the scope of the invention.

In one or more embodiments of the invention, priority and/or relative priority information relating to the controlled devices is provided by the user, or otherwise automatically determined by or known to the system, and may be based on, at least in part, a relative importance of a given controlled device. For example, the priority of a controlled device may be based, at least in part, on whether the controlled device is redundant, the need for that controlled device to maintain operations, a controlled device's reliance upon other controlled devices, other controlled devices reliance upon the controlled device, the power consumed by the controlled device, or any of the other data associated with the controlled device, etc.

In Step 308, a determination is made as to whether the power consumption data from any one PSU exceeds a threshold. In one or more embodiments of the invention, the threshold may be calculated based on a fixed percentage of the total power capacity of the PSU, a fixed power quantity below the total power capacity of the PSU, dynamically calculated based on any combination of variables (e.g., PSU data, controlled device data, historical data, predictive data), entered by a user, or any combination thereof.

In one or more embodiments of the invention, if the power consumption data for the PSU indicates that the power consumption is below the threshold, the method ends. However, in the event that the PSU data indicates that power consumption exceeds the threshold, the supervisor initiates one or multiple power response procedures (Step 310).

In Step 310, a power response procedure is initiated in response to the determination that the PSU consumed power is above the PSU power threshold. In one or more embodiments of the invention, there are multiple power response procedures that the supervisor may implement (discussed in FIGS. 4-6 below). Lastly, after the completion of the power response procedure, the method returns to Step 300.

Figure 5:
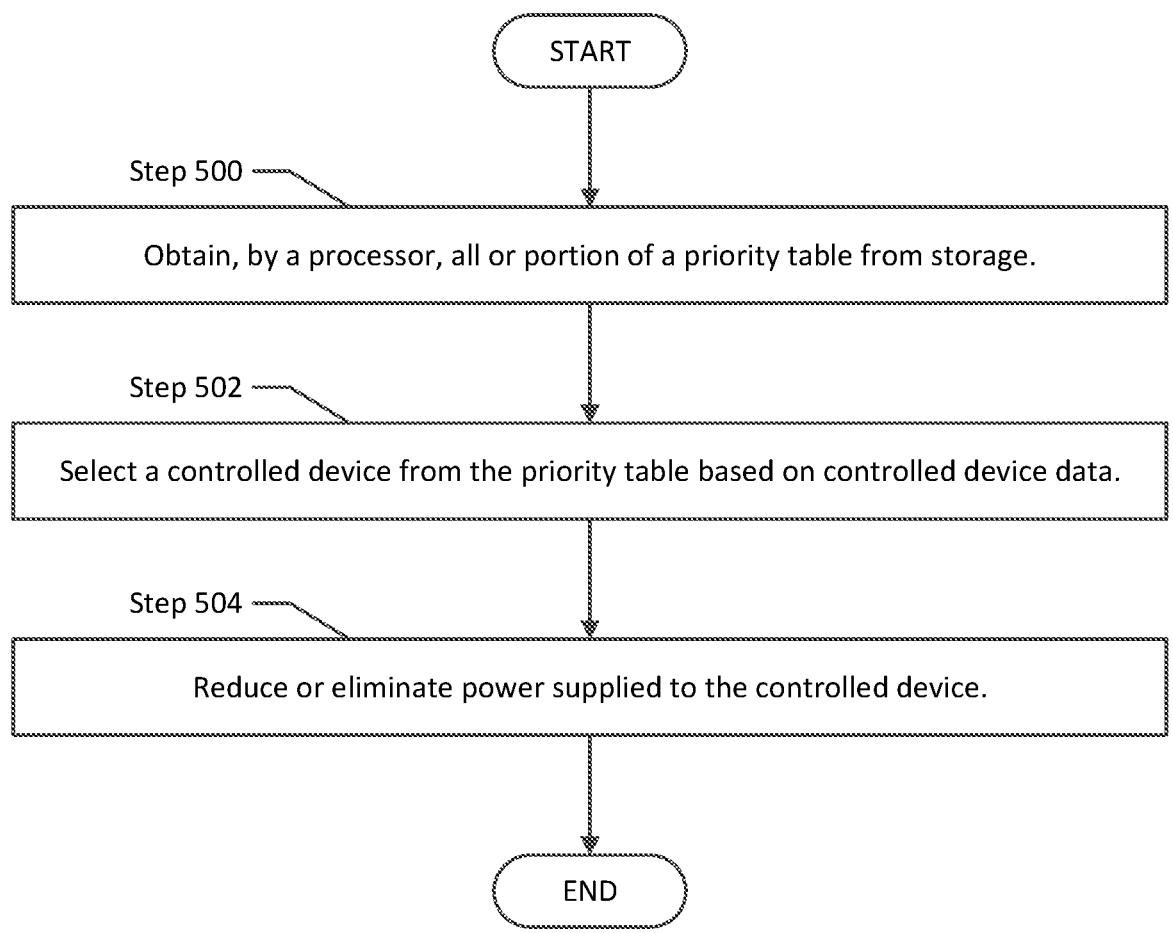
FIG. 5 shows a flowchart in accordance with one or more embodiments of the invention.

In FIG. 5, a method for one possible power response procedure, as initiated in Step 310 of FIG. 3, is shown according to one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In Step 500, all or a portion of the priority table is obtained by the processor from storage. In one or more embodiments of the invention, all or a portion of the priority table is received by the processor via an operative connection between the storage and the processor. The processor may then read the priority table including the most recent controlled device data.

In one or more embodiments of the invention, prior to the controlled device data being saved to storage (Step 306 of FIG. 3), the most recent controlled device data is received by the processor. Thus, it may not be necessary to obtain all or a portion of the priority table from storage, as the processor may already include the most recent controlled device data. In this case, as described in Step 304, the controlled device data is received via an operative connection between the controlled device and the controlled device data receiver of the supervisor.

In Step 502, a controlled device, or set of controlled devices is selected based on, at least, controlled device data. In one or more embodiments of the invention, the selection of the controlled device is not limited to any one factor or combination of factors in the controlled device data. Rather, the selection of the controlled device may be based one or more factors present in the controlled device data and/or priority table.

In one or more embodiments of the invention, a preliminary selection of controlled devices is made to determine which controlled devices, if any, are consuming enough power that, if reduced or removed, would bring the PSU power consumption below the threshold. Then, using that narrower list of controlled devices, a secondary selection process can be made based on any number of other factors (e.g., priority) from the controlled device data.

In one or more embodiments of the invention, the selected controlled device is the lowest priority controlled device. This selection may be made regardless of the power consumption of the controlled device and may not bring the PSU consumption power below the threshold.

In one or more embodiments of the invention, multiple controlled devices are selected simultaneously for reduced or terminated power. The selection of multiple controlled devices may be made, in part, based on a dependency of those devices upon each other, a combined low priority ranking, a combined power consumption, and/or any other combination of factors.

In Step 504, power is reduced or eliminated to the one or more selected controlled devices. The supervisor may eliminate power to the selected controlled device by sending a command to the controlled device to power off via an operative connection between the controlled device and, for example, the controlled device data transmitter of the supervisor.

In one or more embodiments of the invention, the selected controlled device will have its power reduced, instead of terminated, such that power output of the PSU is reduced without fully powering off any controlled device. For example, if there is minimal increase in power usage that exceeds the PSU power threshold for a PSU (thus triggering the power response procedure of Step 310), the system can reduce power to all fans (i.e., selected controlled device), without actually terminating power to any of the fans, thereby reducing the power load on the appropriate PSU.

In one or more embodiments of the invention, the method of FIG. 5 will have to iterate through several loops before the PSU consumption data is below the threshold. Alternatively, in one or more embodiments of the invention, the power response procedure of FIG. 5 is used as one of several other concurrent or staggered power response procedures in response to the determination that a PSU is consuming power above a given power threshold.

Figure 6:
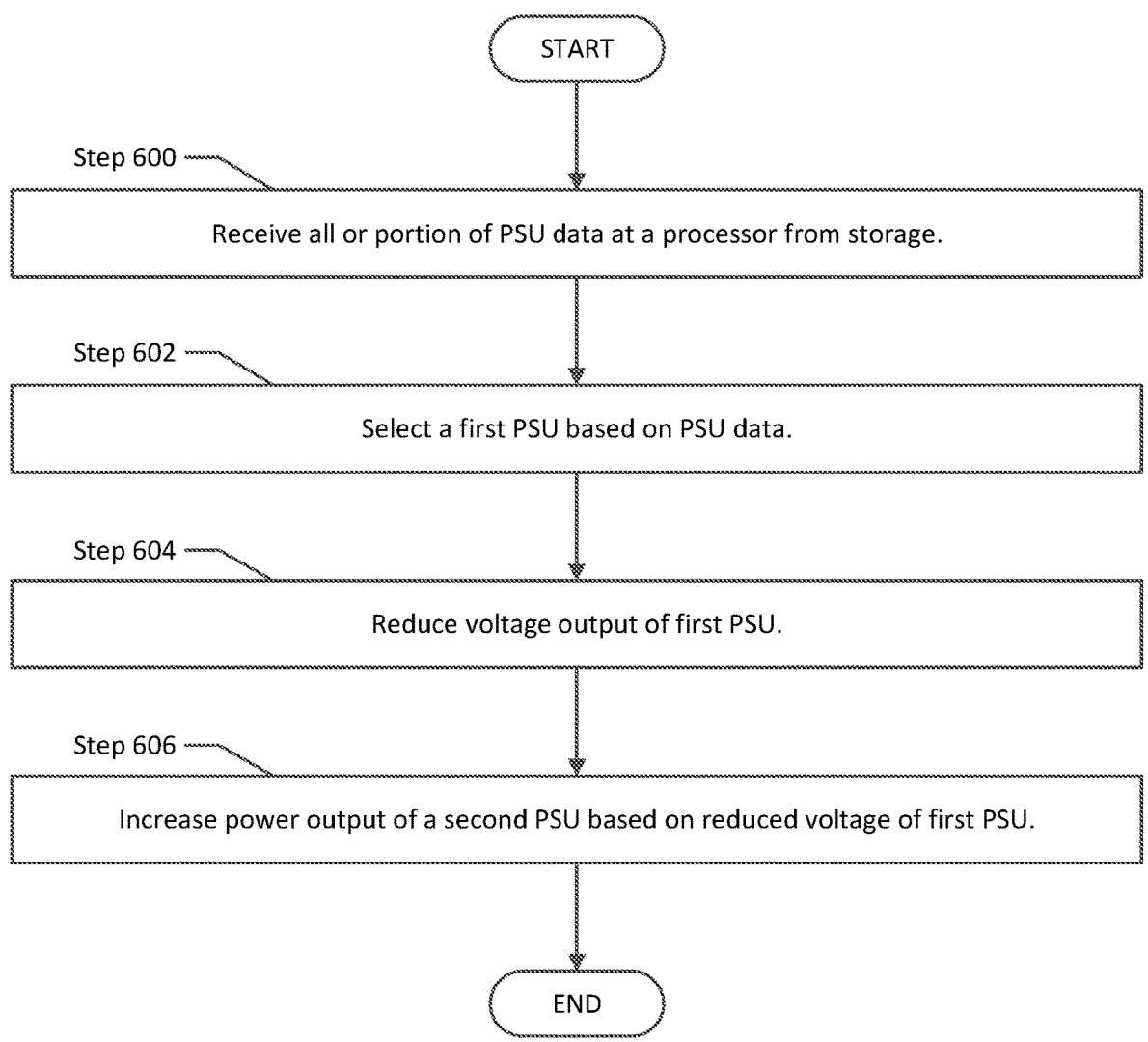
FIG. 6 shows a flowchart in accordance with one or more embodiments of the invention.

In FIG. 6, a method for one possible power response procedure, as initiated in Step 310 of FIG. 3, is shown according to one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In Step 600, all or a portion of the PSU data is obtained from storage at the processor via an operative connection between the storage and the processor. The processor may then read the PSU data, containing the most recent PSU data for the PSUs.

In one or more embodiments of the invention, prior to the PSU data being saved to storage (Step 302 of FIG. 3), the most recent PSU data is received by the processor. Thus, it may not be necessary to obtain all or a portion of the PSU data from storage, as the processor may already include the most recent PSU data. In this case, as described in Step 300, the PSU data is received via an operative connection between the PSU and the processor via the PSU data receiver of the supervisor.

In Step 602, a first PSU (e.g., the PSU determined to be over a power threshold in Step 308 of FIG. 3) is selected, based on, but not limited to, PSU power consumption and PSU power capacity data of the first PSU. For example, a first PSU may be selected based on PSU data related to a high PSU power consumption and low PSU power capacity, thus resulting in little available PSU capacity of the first PSU.

In one or more embodiments of the invention, all PSUs are examined, and the PSU with the least available PSU power capacity, either provided directly by the PSU or calculated by subtracting PSU power consumption from the total PSU power capacity, is selected as the first PSU.

In Step 604, a command is sent to the first PSU to reduce its output voltage. As the output voltage of one PSU is reduced, that PSU may be capable of providing more and/or the same current without exceeding its maximum power rating. In one or more embodiments of the invention, a command is sent to the first PSU, via the operative connection between the supervisor and the first PSU, to instruct the first PSU to output less voltage.

In one or more embodiments of the invention, each PSU (e.g., the first PSU) will be independently configured to reduce voltage, even without a command from the supervisor. That is, the PSU may contain internal circuitry that will force the voltage to drop as the power output of the PSU nears its maximum possible power output. Thus, a command from a supervisor may not be necessary as the PSU will automatically drop voltage.

In Step 606, as a result of the first PSU reducing its voltage, a second PSU consequently provides a higher power than it was previously providing. In one or more embodiments of the invention, each of the PSUs are connected in parallel such that each PSU supplies power that directly correlates to their supplied voltage. Accordingly, reducing the output voltage of the first PSU may cause the first PSU to output less power and may further cause the second PSU to output more power to the devices of that system.

Similarly, because the PSU providing the most voltage will provide the most power; instead of reducing the voltage of the PSU operating beyond capacity (e.g., the first PSU), it may be possible to increase the voltage of one or more other PSUs (e.g., the second PSU) to be equal to or greater than the voltage of the PSU operating beyond capacity (e.g., the first PSU). In that circumstance, the same result is achieved as the relative voltage difference provided by the PSU operating beyond capacity (e.g., the first PSU) and one or more other PSUs (e.g., the second PSU) is reduced, thereby shifting the power output among the PSUs.

In one or more embodiments of the invention, the method of FIG. 6 may have to iterate through several loops before the first PSU consumption data is below the power threshold. Alternatively, in one or more embodiments of the invention, the power response procedure of FIG. 6 may only be used as one of several other concurrent or staggered power response procedures in response to the determination that a first PSU is consuming power above a given threshold.

Additionally, in one or more embodiments of the invention, the method of FIG. 6 may be implemented without the initiation of a power response procedure. That is, the method of FIG. 6 may be used independently to load balance two or more PSUs. In that case, a first PSU may be selected based on a determination that the first PSU is utilizing the most PSU power capacity among all of the PSUs; and, subsequently reducing its output voltage will force other PSUs to pick up more of the load, thus achieving a more load balanced system.

In one or more embodiments of the invention, where the load balancing method of FIG. 6 is initiated independent of a power response procedure, each PSU is capable of utilizing more of its overall capacity. That is, as there may be a powering balancing procedure in place, the power thresholds for each PSU may be reduced or removed. Accordingly, in one or more embodiments of the invention, as power consumption steadily increases, the active supervisor will continuously shift power from one PSU to another, until at least one PSU is outputting power nearly equal to its maximum possible power capacity.

Figure 7A:
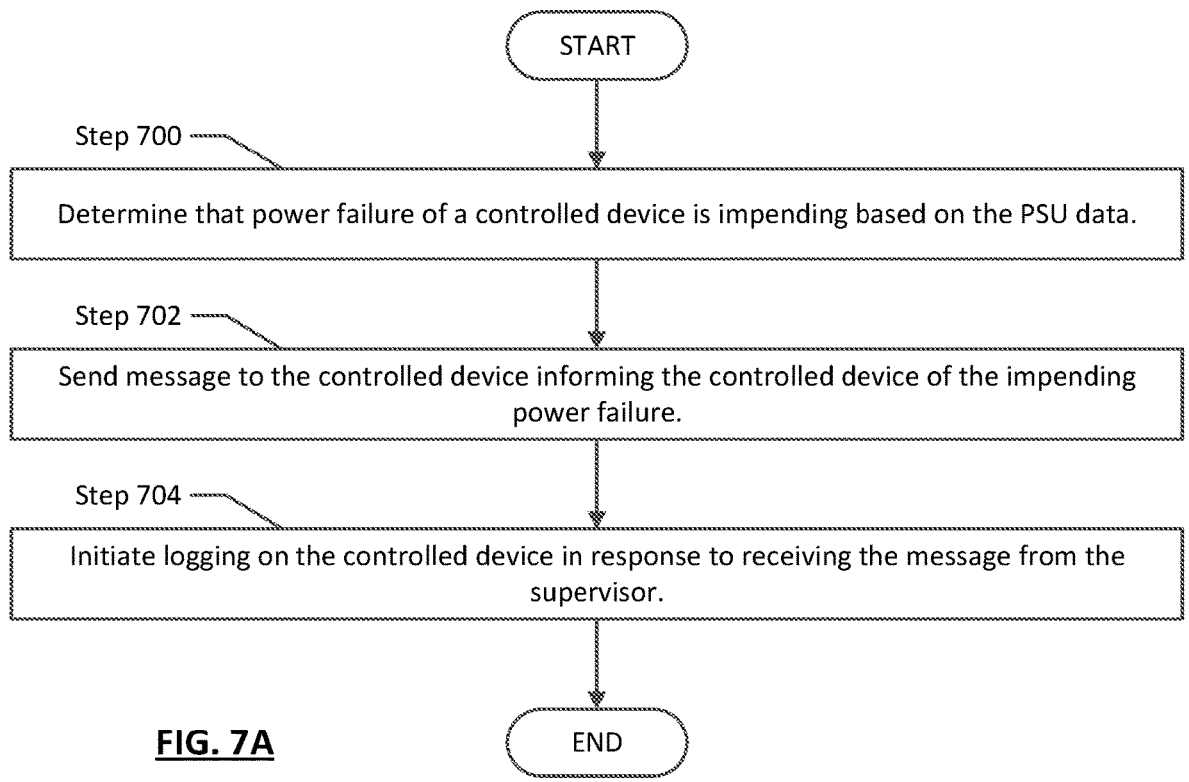
FIG. 7A shows a flowchart in accordance with one or more embodiments of the invention.

In FIG. 7A, a method for one possible power response procedure, as initiated in Step 310 of FIG. 3, is shown according to one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In Step 700, a determination is made that the power to one or more controlled devices is going to fail. For example, based on power data received from the PSUs of a system, a determination may be made that a system shutdown is imminent. In such a scenario, the loss of power affects all controlled devices of the system. In one or more embodiments of the invention, by analyzing the controlled device data and/or PSU data, a determination in made that at least one PSU is going to fail; and consequently, the supervisor may know, by virtue of the PSU data and/or controlled device data, which controlled devices are powered by the soon-to-fail PSU and any other PSUs that may fail as a result of the failure of the first PSU.

In one or more embodiments of the invention, the determination that a system shutdown is going to occur, or at least one or more PSUs are going to fail is based on a predictive algorithm that determines based on, but not limited to, the controlled device data and/or PSU data, that power consumption is going to increase beyond the maximum power capacity of at least one PSU. Additionally, the determination may be made that the PSU is going to fail after attempting one or more power response procedures and/or may be based on an inability to perform other power response procedures.

In Step 702, in response to the determination that the controlled device is going to lose power, a 'dying gasp' or 'last gasp' message and/or command is sent from the supervisor to the controlled device indicating that power failure is imminent. The message and/or command is sent from the supervisor to the controlled device via an operative connection between the controlled device and the controlled device data transmitter of the supervisor.

In one or more embodiments of the invention, the message sent from the supervisor to the controlled device is a pre-written message already saved in storage. Accordingly, the supervisor may transmit the message to the controlled device without having to formulate the contents of the message, thereby saving time. Alternatively, the supervisor may generate or cause the generation of the message, which is then transmitted to one or more controlled devices.

In Step 704, in response to receiving the message from the supervisor indicating impending power failure, the controlled device initiates a logging procedure. In one or more embodiments of the invention, the logging procedure initiates the recording of data that includes, but is not limited to, a list of devices with which the controlled device is currently communicating, the data (if any) that is currently being transmitted, a line quality monitor log, controlled device state information, or any other information that could be useful in debugging the cause of the system shutdown. In one or more embodiments of the invention, the logging information is stored in persistent storage of the system. For example, as much of the logging data as is possible to capture prior to a system shutdown may be stored on one or more flash storage devices of the system.

In one or more embodiments of the invention, the supervisor does not need to send a 'dying gasp' or 'last gasp' message to initiate the recording of a logging procedure. Rather, the controlled devices may record some or all of the information associated with a logging procedure independently and without first receiving a 'dying gasp' or 'last gasp' message. For example, the controlled device may record the logging information in some form of circular memory such that the most newly recorded data overwrites the oldest data, thereby allowing for the continual recording of logging information. Accordingly, in the event that the system fails and no 'dying gasp' or 'last gasp' message is sent, some logging data may still exist to assist in debugging the system.

In one or more embodiments of the invention, the controlled device does not need to process the message beyond recognizing the 'last gasp' message indicating impending failure. Thus, the controlled device may immediately initiate a logging procedure in response to receiving the message.

Figure 7B:
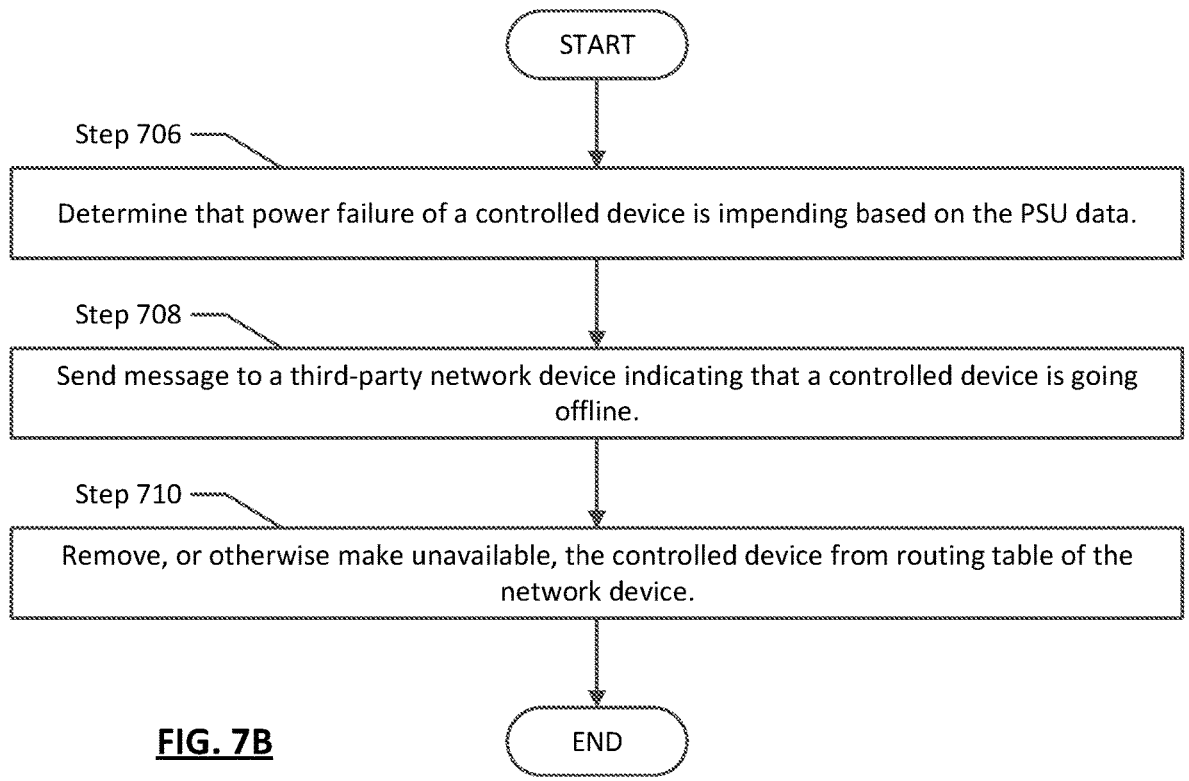
FIG. 7B shows a flowchart in accordance with one or more embodiments of the invention.

In FIG. 7B, a method for one possible power response procedure, as initiated in Step 310 of FIG. 3, is shown according to one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In Step 706, a determination is made that the power to one or more controlled devices is going to fail. For example, based on power data received from the PSUs of a system, a determination may be made that a system shutdown is imminent. In such a scenario, the loss of power affects all controlled devices of the system. In one or more embodiments of the invention, by analyzing the controlled device data and/or PSU data, a determination in made that at least one PSU is going to fail; and consequently, the supervisor may know, by virtue of the PSU data and/or controlled device data, which controlled devices are powered by the soon-to-fail PSU and any other PSUs that may fail as a result of the failure of the first PSU.

In one or more embodiments of the invention, the determination that a system shutdown is going to occur, or at least one or more PSUs are going to fail is based on a predictive algorithm that determines based on, but not limited to, the controlled device data and/or PSU data, that power consumption is going to increase beyond the maximum power capacity of at least one PSU. Additionally, the determination may be made that the PSU is going to fail after attempting one or more power response procedures and/or may be based on an inability to perform other power response procedures.

In Step 708, in response to the determination that the controlled device is going to lose power, a 'dying gasp' or 'last gasp' message/command is sent from the supervisor to an operatively connected external device (e.g., a peer network device connected to a port of the system) indicating that power failure of the controlled device is imminent. In one or more embodiments of the invention, the 'dying gasp' or 'last gasp' message/command is sent via an operative connection between the supervisor and the external network device. As an example, a supervisor may be an FPGA, and the FPGA logic may be provided with an in-band communication port over which the messages are sent to one or more external devices (e.g., a server).

In one or more embodiments of the invention, the message sent from the supervisor to the controlled device is a pre-written message already saved in storage. Accordingly, the supervisor may transmit the message to the controlled device without having to formulate the contents of the message, thereby saving time. Alternatively, the supervisor may generate or cause the generation of the message, which is then transmitted to one or more external devices.

In one or more embodiments of the invention, the message sent to the control device includes information as to the cause of the failure of the controlled device. For instance, the message may indicate that the PSU is failing due to over-temperature, AC input failure, or any other PSU related failure for which a message may exist.

In one or more embodiments of the invention, the external device is not powered by the same PSU or plurality of PSUs that are going to fail. Rather, in one or more embodiments of the invention, the external device is part of an independently powered system operatively connected to the system that includes the supervisor. In one or more embodiments of the invention, the external device may be, but is not limited to, any network device that may communicate with, or be responsible for directing data through the controlled device. Examples of external devices include, but are not limited to, network devices (e.g., network devices in the same multi-chassis link aggregation group (MLAG)), a computing device, any suitable failover device, and/or any other device to which the failing system is operatively connected.

In Step 710, in response to receiving the message from the supervisor, the external device removes, or otherwise makes unavailable, the system or any portion thereof for performing any functionality related to the external device (e.g., routing network traffic). In one or more embodiments of the invention, the external device may dis-associate with the system, or any portion thereof, completely, or associate the system with a metric that would make the controlled device undesirable for continued communication and/or interaction (e.g., increasing a route cost metric associated with the system and used in routing network traffic to avoid routing network traffic to the system).

In embodiments of the invention in which the external device is a network device, the external device will remove from or otherwise alter information relating to the system in any routing table, routing information base (RIB), forwarding information base (FIB), or any other list, table, and/or data structure for which the external device associates with the controlled device.

In one or more embodiments of the invention, upon the system or any portion thereof regaining power and/or functionality, the supervisor sends a message to the external device indicating that the system is again available for sending and/or receiving data. Similarly, the external device may re-associate with the system or associate the system with a more favorable metric indicating the controlled device's availability.

Figure 8:
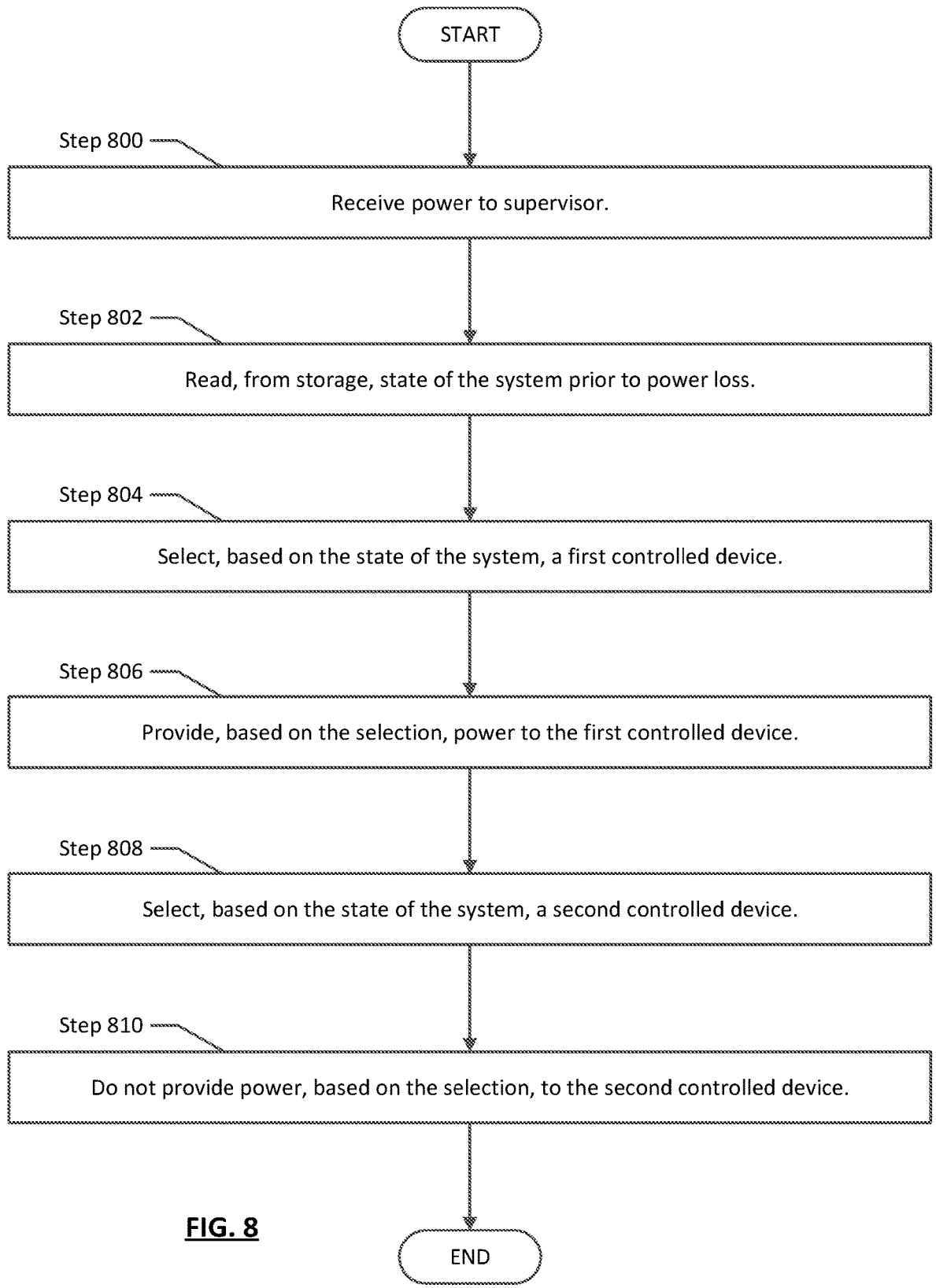
FIG. 8 shows a flowchart in accordance with one or more embodiments of the invention.

In FIG. 8, a method for restart procedure is shown according to one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In Step 800, the supervisor is provided power. In one or more embodiments of the invention, the power is provided to the supervisor after a previous power failure. For example, after a cascading power failure of all PSUs leading to a system shutdown, the system may be restarted at some point in the future. Accordingly, the supervisor may start, after being provided power, and regain functionality.

In one or more embodiments of the invention, the supervisor does not initially allow for any controlled device of the system to be powered. Rather, in one or more embodiments of the invention, one or more PSUs provide power to the supervisor, without providing power to any additional devices. For example, although every PSU may be back online and the supervisor is powered on and functioning, the supervisor may actively prevent any or all of the controlled devices from powering on and thereby consuming power from the PSU.

In Step 802, the supervisor reads from storage a state of the system prior to being powered off. In one or more embodiments of the invention, the state may include the PSU data, controlled device data, the priority table, and/or any other information the supervisor may be able to access.

In one or more embodiments of the invention, as part of the state information, the supervisor receives from the storage all or a portion of the controlled device data and the PSU data as it existed prior to the supervisor being powered off. Then, the supervisor may analyze the controlled device data and/or PSU data to determine which devices or PSUs, if any, may have caused or contributed to the system powering off.

In one or more embodiments of the invention, the supervisor may access the aforementioned data by querying any operatively connected device that may include data. For example, the supervisor may query an independently powered external device to determine if a 'dying gasp' or 'last gasp' message/command was sent to that device. If it is determined that a message was sent, the external device may send a copy of the message, or a portion thereof, to the supervisor.

In Step 804, a first controlled device is selected based on the state of the system prior to power loss. For example, the first controlled device may be selected, at least in part, based on the data associated with the first controlled device including, but not limited to, power consumption data, priority, association with other devices, or any other factor as it existed in the state of the controlled device data and/or PSU data.

In one or more embodiments of the invention, the first controlled device is selected due to a very high priority ranking and/or low power consumption data from the state of the system prior to being powered off. For example, if a particular line card is critically important (and therefore has a very high priority ranking), that line card may be selected as it requires the quickest resumption of operations.

In Step 806, power is provided to the first controlled device based on the selection in Step 804. In one or more embodiments of the invention, the supervisor sends a command to the first controlled device via the operative connection between the supervisor and the first controlled device that causes the first controlled device to power on. Alternatively, the supervisor may send a command to a PSU to provide power to the selected first controlled device.

In Step 808, a second controlled device is selected based on the state of the system prior to power loss. For example, the second controlled device may selected, at least in part, based on the data associated with the second controlled device including, but not limited to, power consumption data, priority, association with other devices, or any other factor as it existed in the state of the controlled device data and/or PSU data.

In one or more embodiments of the invention, the second controlled device is selected due to a very low priority ranking and/or high power consumption data as indicated in the state data. For example, the passive supervisor may be selected due to its potentially low priority ranking and/or high power consumption data prior to failure.

In one or more embodiments of the invention, a second controlled device is selected based on abnormal power behavior as indicated in the state data. Abnormal power behavior may include surges in power consumption, more power consumption than is normal for that controlled device (as may be compared to historical data for that controlled device), drawing more power than any one PSU may have the capacity for, or any other power consumption factor that may affect the system.

For example, the supervisor may select the second controlled device if the state data indicates that the controlled device was drawing an unusually large power at the time of failure (as compared to that controlled device's typical power consumption). As another example, the supervisor may a select a second controlled device based on a power consumption usage that is very high, even if typical of that controlled device.

In Step 810, power is not provided to the second controlled device based on the selection from Step 808. In one or more embodiments of the invention, the supervisor will continue to actively prevent the second controlled device from receiving power by not sending a command causing the second controlled device to power on. Alternatively, the supervisor may continue to not send a command to any PSU to provide power to the second controlled device.

In one or more embodiments of the invention, the method of Steps 804-806 will be iterated through two or more times (selectively powering on controlled devices) based on the state data prior to failure. Additionally, the second controlled device selected in Step 808 (and not powered on in Step 810), may continue to not be powered for two or more iterations (e.g., as other controlled devices are being powered on) and/or until any potential issues with that the second controlled device have been addressed (e.g., identified and corrected by a network administrator).

In one or more embodiments of the invention, if the system again fails within a short period of time after restarting, or loses power a certain number of times within a period of time, the supervisor may be configured to prevent startup of any of the controlled devices. Accordingly, in one or more embodiments of the invention, if the system is repetitively failing due to some issue with a controlled device beyond the supervisor's control, the system will not endlessly power cycle. Rather, the supervisor may be given a finite number of attempts to start the system and make determinations as to which controlled devices receive power.

In one or more embodiments of the invention, the information from the state of the system prior to power loss may be used for any debugging purpose, even a purpose unrelated to restarting the system. For example, the state of the system prior to power loss can be manually examined to determine which controlled device, if any, operated abnormally, or if there was some other issue with the power supplied to the system. One of ordinary skill in the art would appreciate that the data retained prior to failure could be examined and used to solve other problems not specifically contemplated here.

Figure 9:
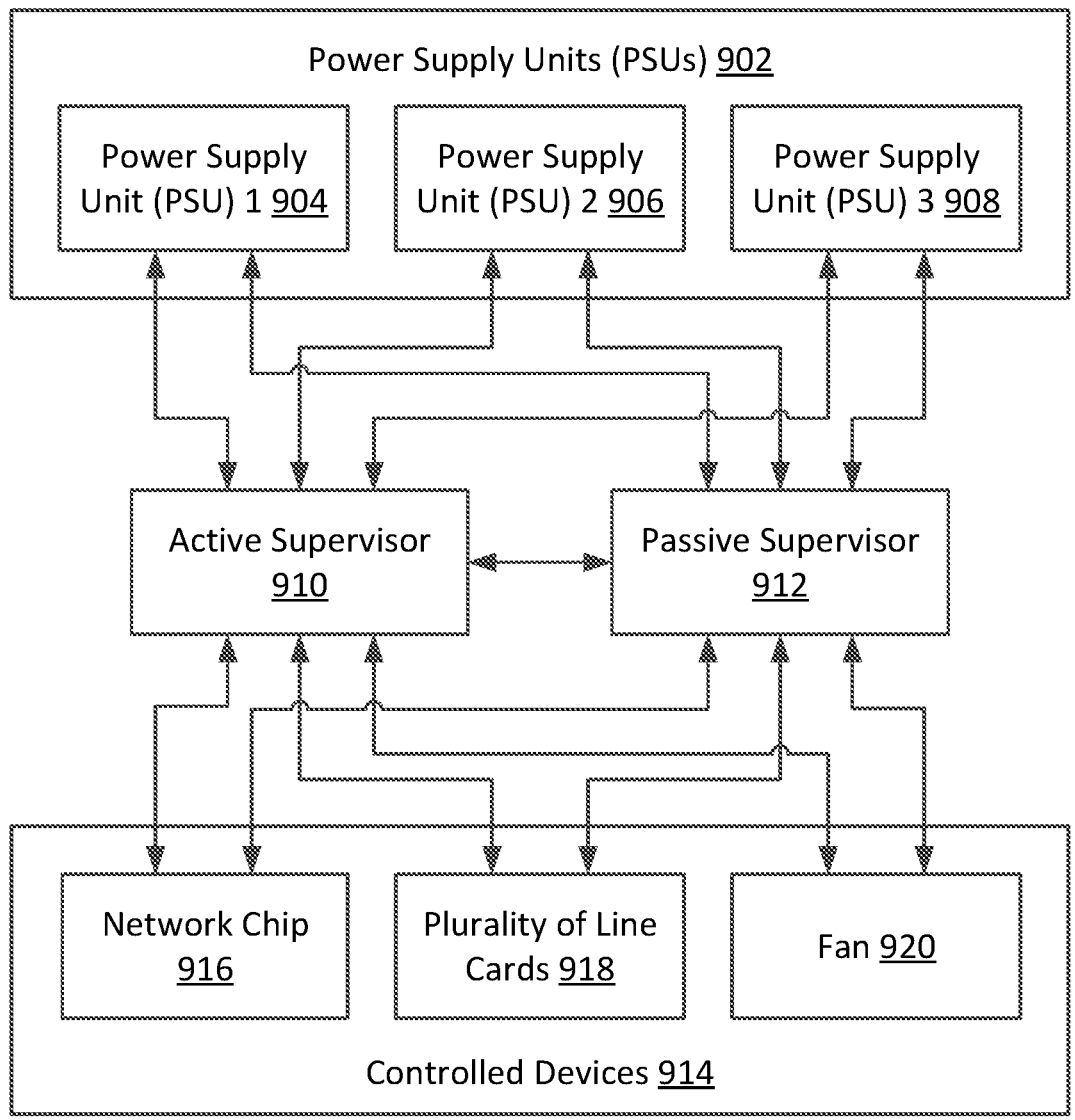
FIG. 9 shows an example in accordance with one or more embodiments of the invention.

FIG. 9 shows an example in accordance with one or more embodiments of the invention. The following use cases are for explanatory purposes only and not intended to limit the scope of the invention.

Use Case 1

In FIG. 9, consider a scenario in which a system includes PSUs (902) (e.g., PSU 1 (904), PSU 2 (906), PSU 3 (908)), controlled devices (914) (e.g., network chip (916), plurality of line cards (918), fan (920)), an active supervisor (910), and a passive supervisor (912).

In such a scenario, the active supervisor (910) receives updated PSU data and updated controlled device data from the PSUs (902) and controlled devices (914), respectively. Further, PSU 2 has a maximum power capacity of 3000 W, with a power consumption threshold calculated as 95% of the total capacity (i.e., 2850 W). The PSU data is stored in a PSU data table (1002) shown in FIG. 10B, and the controlled device data is stored in the priority table (1000) shown in FIG. 10A.

In analyzing the PSU and controlled device data in their respective tables, the active supervisor (910) determines that the power consumption data for PSU 2 (906) is at 2900 W (i.e., the instant power output for PSU 2 (906) shown in the PSU data table (1002) of FIG. 10B), 50 W above the 2850 W threshold (i.e., the power threshold for PSU 2 (906) shown in the PSU data table (1002) of FIG. 10B). Accordingly, the active supervisor (910) initiates a power response procedure.

To initiate the power response procedure, the active supervisor (910) reads the priority table (1000) of FIG. 10A and determines that network chip (916) is consuming 150 W of power, and that network chip (916) has the lowest priority of the controlled devices (914) using the appropriate columns and the network chip row of the priority table (1000). The 150 W consumed by the network chip (916) is greater than the 50 W above the threshold seen on PSU 2 (906), meaning that terminating power to the network chip (916) would reduce the load on PSU 2 (906) by a great enough amount to have the power being consumed from PSU 2 (906) below the power consumption threshold for PSU 2 (906). Accordingly, the active supervisor (910) terminates power to the network chip (916) by sending a command to the network chip (916) to power off.

The active supervisor (910) then receives updated PSU data and updated controlled device data from the PSUs (902) and controlled devices (914), respectively. In analyzing the updated data, the active supervisor (910) determines that each PSU (904, 906, or 908) is consuming power below their given threshold. Accordingly, potential failure of PSU 2 (906) and/or the system as a whole has been averted.

Sometime later, the active supervisor (910) receives updated PSU data and updated controlled devices data from the PSUs (902) and controlled devices (914), respectively. The data received from the PSUs (902) and controlled devices (914) to the active supervisor (910) arrive after 100 μs. In analyzing the PSU and controlled device data, the active supervisor (910) determines that the power consumption data for PSU 1 (908) is at 5600 W, 3000 W over the power threshold and 2600 W over the maximum possible power capacity (3000 W). However, as PSU 1 (908) can handle brief (i.e., 500 μs) surges in power twice its maximum capacity (i.e., 6000 W), PSU 1 (908) does not fail. Accordingly, the active supervisor (910) initiates a power response procedure.

To initiate the power response procedure, the active supervisor (910) reads the priority table (1000) of FIG. 10A and determines that line card 1 (not shown) is consuming 3000 W of power. Accordingly, the active supervisor (910) terminates power to line card 1 (not shown) by sending a command to line card 1 (not shown) to power off. The command to power off line card 1 (not shown) takes 100 μs to send from the active supervisor (910).

Accordingly, the command to power off is received by line card 1 (not shown) 200 μs after the surge in power actually occurs (100 μs for the transmission of PSU data from the PSUs (902) to the active supervisor (910), and 100 μs for the transmission of the power off command from the active supervisor (910) to line card 1). Thus, as PSU 1 (908) can withstand power consumption of 6000 W for 500 μs, the power to line card 1 (not shown) is terminated within that window, thereby averting a shutdown of PSU 1 (908).

The active supervisor (910) then receives updated PSU data and updated controlled device data from the PSUs (902) and controlled devices (914), respectively. In analyzing the updated data, the active supervisor (910) determines that each PSU (904, 906, or 908) is consuming power below their given threshold. Accordingly, potential failure of PSU 1 (904) and/or the system as a whole has been averted.

Use Case 2

In FIG. 9, consider a scenario in which the active supervisor (910) receives updated PSU data and updated controlled device data from the PSUs (902) and controlled devices (914), respectively. Further, PSU 1 (904) has a maximum power capacity of 3000 W, with a power consumption threshold calculated as 100 W below the maximum power capacity (i.e., 2900 W). Similarly, PSU 3 (908) has a maximum power capacity of 3000 W, with a power consumption threshold calculated as 100 W below the maximum power capacity (i.e., 2900 W). The PSU data is stored in a PSU data table (1102) shown in FIG. 11B, and the controlled device data is stored in the priority table (1100) shown in FIG. 11A.

In analyzing the PSU and controlled device data, the active supervisor (910) determines that the power consumption data for PSU 3 (908) is at 2880 W (i.e., the instant power output for PSU 3 (908) shown in the PSU data table (1102) of FIG. 11B), 20 W below the 2900 W threshold (i.e., the power threshold for PSU 3 (909) shown in the PSU data table (1102) of FIG. 11B). Further, the active supervisor (910) determines that the power consumption data for PSU 1 (904) is at 2905 W (i.e., the instant power output for PSU 1 (904) shown in the PSU data table (1102) of FIG. 10B), 5 W above the 2900 W threshold (i.e., the power threshold for PSU 1 (904) shown in the PSU data table (1102) of FIG. 11B). Accordingly, the active supervisor (910) initiates a power response procedure.

To initiate the power response procedure, the active supervisor (910) reads the PSU data and determines that PSU 1 (904) has an output voltage of 12.3 Volts, the highest of each of the PSUs. Accordingly, the supervisor sends a command to PSU 1 (904) to drop its output voltage to 12.0 Volts. In response to receiving the command, PSU 1 (904) then drops its supplied voltage to 12.0 Volts. As a result of PSU 1 (904) lowering its output voltage, PSUs 2, 3, and 4 (906, 908, not shown) comparatively provide higher power than they provided previously. In particular, PSU 3 (908) provides 12.2 Volts, which is higher than the other PSUs (904, 906), and thus provides more power.

As each of the PSUs (904, 906, 908) are connected in parallel, the PSU providing the most voltage will also be the PSU providing the most power. Accordingly, as PSU 3 (908) is providing the most voltage, power will naturally shift to PSU 3 (908), thereby taking the burden off of PSU 1 (904). Thus, as PSU 1 (904) lowered its voltage, PSU 1 (904) also reduced its supplied power thereby bringing the power consumption back below the power threshold.

The active supervisor (910) then receives updated PSU data and updated controlled device data from the PSUs (902) and controlled devices (914), respectively. In analyzing the updated data, the active supervisor (910) determines that each PSU (904, 906, or 908) is consuming power below their given threshold. Accordingly, potential failure of PSU 1 (904) and/or the system as a whole has been averted.

Use Case 3

In FIG. 9, consider a scenario in which the active supervisor (910) receives updated PSU data and updated controlled device data from the PSUs (902) and controlled devices (914), respectively. Further, PSU 1 (904), PSU 2 (906), and PSU 3 (908) each have a maximum power capacity of 5000 W, with a power consumption threshold of 4900 W. The PSU data is stored in a PSU data table (1202) shown in FIG. 12B, and the controlled device data is stored in the priority table (1200) shown in FIG. 12A.

In analyzing the PSU and controlled device data, the active supervisor (910) determines that the power consumption data for PSU 1 (904), PSU 2 (906), and PSU 3 (908) are each at 4999 W, 99 W above the 4900 W threshold and only 1 W from the maximum capacity (i.e., the instant power output for PSUs 1-3 (904, 906, 908) shown in the PSU data table (1202) of FIG. 12B). Accordingly, the active supervisor (910) initiates a power response procedure.

To initiate the power response procedure, the active supervisor (910) reads the priority table (1200) of FIG. 12A and determines that the plurality of line cards (918) is consuming 800 W of power. Accordingly, the active supervisor (910) attempts to terminate power to the plurality of line cards (918) by sending a command to the plurality of line cards (918) to power off.

However, the plurality of line cards (918) does not power off and continues to consume power. Accordingly, the active supervisor (910) reads the priority table (1200) of FIG. 12A and determines that fan (920) is consuming 75 W of power. Accordingly, the active supervisor (910) terminates power to the fan (920) by sending a command to the fan (920) to power off.

In response to receiving the command, fan (920) powers off. However, as the fan (920) was used to cool line card 1 (not shown), the temperature of line card 1 (not shown) increases from 150° F. to 200° F. (i.e., the temperature column for line card 1 shown in the priority table (1200) of FIG. 12A). As the temperature of line card 1 (not shown) increases, the power consumption of line card 1 (not shown) also increases from 680 W to 800 W.

Accordingly, the active supervisor (910) determines that system shutdown is imminent and initiates a power response procedure. In response to the determination, the active supervisor (910) sends a message to the all controlled devices connected to the active supervisor that power failure is imminent due to PSU failure. In response to receiving that message, each controlled device initiates a logging procedure that saves a log of ongoing data communication, which may be used, for example, as part of a debugging process to determine the cause of system shutdown.

Additionally, in response to the determination, the active supervisor (910) sends a message to a router (not shown) that the plurality of line cards (918) is going to go offline. In response to receiving that message, the router updates its routing table to associate the plurality of line cards (918) with a higher route cost, thereby causing the router not to use interfaces of the line cards when routing network traffic. Thus, for future requests to route data, when the router performs a routing table lookup, the plurality of line cards (918) will be excluded as a possible route for the data.

Additionally, after a future determination by the active supervisor (910) that the system is operating normally, an additional message is sent to the router that the plurality of line cards (918) is again available. Consequently, the router then updates its routing table to provide the plurality of line cards (918) a lower route cost so that data may be routed through the plurality of line cards (918) once again.

Use Case 4

In FIG. 9, consider a scenario in which the PSUs (902) gain AC power from a powered off state that occurred due to a system shutdown. Once powered on, one or more of the PSUs (902) then provides power to the active supervisor (910). In response to receiving power, the active supervisor (910) will power on and become operational.

However, prior to providing power to any of the controlled devices (914) in the system, the active supervisor (910) recognizes that the prior system shutdown was caused by an unexpected power failure (instead of a planned or controlled shut down). Accordingly, the active supervisor (910) prevents any of the controlled devices (914) from powering on.

Instead, the active supervisor (910) recalls from storage the most recent PSU and controlled device data. In analyzing the PSU and controlled device data (as it existed prior to the system losing power), the active supervisor (910) determines that the power capacity data for PSU 1 (904), PSU 2 (906), and PSU 3 (908) were each at 2000 W (i.e., the maximum possible power capacity column shown in the previous PSU data table (1302) of FIG. 13B).

Additionally, the active supervisor (910) determines that the last recorded power consumption data for network chip (916) was 200 W, the last recorded power consumption data for fan (920) was 50 W, and the last recorded power consumption data for the plurality of line cards (918) was 2600 W (i.e., the power consumption column shown in the previous priority table (1300) of FIG. 13A), which is higher than any of the PSU's maximum possible power output.

Accordingly, in response to reading the PSU and controlled device data as it existed prior to losing power, the active supervisor (910) sends a command to the network chip (916) and the fan (920) to power on. However, the active supervisor (910) does not send a command to the plurality of line cards (918) to power on due to its large power draw.

Subsequently, the network chip (916), the fan (920), and a variety of other controlled devices (not shown) are provided power from the PSUs (902). However, for some unknown reason, the aggregate power being consumed by the controlled devices (914) connected to PSUs (902) surges to 6100 W. Consequently, PSU 1 (904) powers off as it cannot sustain more than 4000 W of power consumption, even temporarily. The load from the controlled devices connected to PSU 1 (904) is then transferred to the remaining PSUs (i.e., PSU 2 (906) and PSU 3 (908)). Subsequently, PSU 2 (906) also powers off as it also cannot withstand more than 4000 W of power consumption. In turn. the entirety of the remaining load is then transferred to PSU 3 (908). Similarly, PSU 3 (908) powers off as it also cannot withstand more than 4000 W of power consumption. Thus, as all PSUs (902) have powered off, the system fails again.

After the failure, the PSUs (902) gain AC power from a powered off state. Once powered on, one or more of the PSUs (902) then provides power to the active supervisor (910). In response to receiving power, the active supervisor (910) will power on and become operational.

However, prior to powering on any of the controlled devices (914), the active supervisor (910) recognizes that the prior system shutdown was caused by an unexpected power failure (instead of a planned or controlled shut down). Accordingly, the active supervisor (910) prevents any of the controlled devices (914) from powering on.

Instead, the active supervisor (910) calls from memory the most recent PSU and controlled device data. In analyzing the PSU and controlled device data (as it existed prior to losing power), the active supervisor (910) determines that there were two consecutive unexpected system shutdowns. In response to this determination, the active supervisor (910) prevents any controlled device from gaining power, thereby ending the cycle of the system powering on and shutting down. This may prevent further damage to the system and/or allow action to be taken to identify the one or more problems causing the repeated system shutdowns and correct the problems.

One or more embodiments of the invention make it possible to avert an unexpected system shutdown and/or gain information about the possible causes of the system shutdown by employing one or more power response procedures, such as removing power to one or more controlled devices, shifting one or more controlled devices to a different power supply, and sending messages to cause logging and/or to provide shutdown alerts. Further, one or more embodiments of the invention employ communication between the supervisors and the controlled devices and PSUs that is fast enough to be able initiate power response procedures within a PSU surge window, such that sudden surges in power can be handled within the surge window, thereby averting a total or partial system shutdown. Additionally, one or more embodiments of the invention allow the power consumption to be balanced between each PSU, allowing for each PSU to use more of its overall capacity thus potentially reducing the number of PSUs required to power the system. Additionally, embodiments of the invention allow for a system to regain at least partial functionality after an unexpected system shutdown by powering on less than all the controlled devices in the system. Lastly, embodiments of the invention may allow for prevention of repeated system shutdown by determining that more than one shutdown in a row has occurred prior to powering on controlled devices in the system.

Embodiments of the invention described above allow for, at least, centralized management of the power in a modular system. While the invention has been described with respect to a limited number of embodiments and examples, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for power management, the method comprising:

receiving, via a processor, power supply unit (PSU) power capacity data and PSU power consumption data from each PSU in a set of PSUs;

receiving, via the processor, controlled device power consumption data from a set of controlled devices;

updating, via the processor, a priority table with the controlled device power consumption data received from the set of controlled devices;

determining, via the processor, whether the PSU power consumption data of any of the PSUs in the set of PSUs exceeds an associated threshold, the associated threshold for each of the PSUs calculated based on the PSU power capacity data for the PSU;

selecting one or more controlled devices in the set of controlled devices, wherein the selecting is based on the controlled device power consumption data in the priority table for the set of controlled devices; and implementing a power response procedure in response to determining the PSU power consumption data of any of the PSUs in the set of PSUs exceeds the associated threshold, the power response procedure including:

reducing power consumption in at least one of the selected one or more controlled devices and/or in one or more of the PSUs in the set of PSUs for which the PSU power consumption data exceeds the associated threshold;

determining power being supplied by the set of PSUs to a first controlled device in the set of controlled devices is going to fail based on the PSU power capacity data and PSU power consumption data received from the set of PSUs;

sending a message to a network device, wherein the network device does not receive power from any of the PSUs in the set of PSUs and wherein the network device includes a routing table including the first controlled device; and removing, by the network device, the first controlled device from the routing table.

2. The method of claim 1, wherein each of the controlled devices in the set of controlled devices comprises one of the processor, a switch, a router, a line card, a fabric card, an individual port of a line card, a central processing unit (CPU), a system control device (SCD), a network chip, an access point, a computing device, a fan, an optical transceiver, a light emitting device, and a power over Ethernet (PoE) port.

3. The method of claim 1, wherein selecting one or more controlled devices in the set of controlled devices comprises selecting the one or more controlled devices in the set of controlled devices in response to determining the PSU power consumption data of any of the PSUs in the set of PSUs exceeds the associated threshold.

4. The method of claim 1, wherein the power response procedure further comprises:

sending, by the processor, a message to one of the controlled devices in the set of controlled devices for which power is going to fail as determined by the processor based on the PSU power capacity data and PSU power consumption data received from the set of PSUs; and initiating a logging procedure in the one of the controlled devices in response to receiving the message.

5. The method of claim 4, wherein the logging procedure comprises recording data associated with the one of the controlled devices and storing the recorded data in persistent memory.

6. The method of claim 5, wherein the power response procedure further comprises:
  identifying the received message as a last gasp message in the one of the controlled devices; and
  initiating the logging procedure without any further processing of the received message in the one of the controlled devices.

7. The method of claim 1, wherein the power response procedure further comprises:
  executing a logging procedure in each of the controlled devices in the set of controlled devices, the logging procedure including:
    recording data associated with the controlled device; and
    storing the recorded data in a circular memory.

8. The method of claim 1, wherein selecting the one or more of the controlled devices in the set of controlled devices comprises selecting one or more of the controlled devices having controlled device power consumption data indicating the controlled device is consuming enough power that, if power supplied to the controlled device is powered off or reduced, the PSU power consumption data of any of the PSUs in the set of PSUs that exceeds the associated threshold would be reduced to below the associated threshold.

9. The method of claim 1, wherein each of the controlled devices of the selected one or more controlled devices has an associated priority ranking stored in the priority table, and wherein powering off or reducing power supplied to at least one of the selected one or more controlled devices comprises selecting the one of the one or more controlled devices having the lowest priority ranking.

10. A non-transitory computer readable medium comprising instructions that, when executed by a processor, perform a method comprising:
  receiving, via a processor, power supply unit (PSU) power capacity data and PSU power consumption data from each PSU in a set of PSUs;
  receiving, via the processor, controlled device power consumption data from a set of controlled devices;
  updating, via the processor, a priority table with the controlled device power consumption data received from the set of controlled devices;
  determining, via the processor, whether the PSU power consumption data of any of the PSUs in the set of PSUs exceeds an associated threshold, the associated threshold for each of the PSUs calculated based on the PSU power capacity data for the PSU;
  selecting one or more controlled devices in the set of controlled devices, wherein the selecting is based on the controlled device power consumption data in the priority table for the set of controlled devices; and
  implementing a power response procedure in response to determining the PSU power consumption data of any of the PSUs in the set of PSUs exceeds the associated threshold, the power response procedure including:
    reducing power consumption in at least one of the selected one or more controlled devices and/or in any of the PSUs in the set of PSUs for which the PSU power consumption data exceeds the associated threshold;
    determining power being supplied by the set of PSUs to a first controlled device in the set of controlled devices is going to fail based on the PSU power capacity data and PSU power consumption data received from the set of PSUs;
    sending a message to a network device, wherein the network device does not receive power from any of the PSUs in the set of PSUs and wherein the network device includes a routing table including the first controlled device; and
    removing, by the network device, the first controlled device from the routing table.

11. The non-transitory computer readable medium of claim 10, wherein selecting one or more controlled devices in the set of controlled devices comprises selecting the one or more controlled devices in the set of controlled devices in response to determining the PSU power consumption data of any of the PSUs in the set of PSUs exceeds the associated threshold.

12. The non-transitory computer readable medium of claim 10, wherein the power response procedure further comprises:
  sending, by the processor, a message to one of the controlled devices in the set of controlled devices for which power is going to fail as determined by the processor based on the PSU power capacity data and PSU power consumption data received from the set of PSUs; and
  initiating a logging procedure in the one of the controlled devices in response to receiving the message.

13. The non-transitory computer readable medium of claim 12, wherein the logging procedure comprises recording data associated with the one of the controlled devices and storing the recorded data in persistent memory.

14. A system for managing power, the system comprising:
  a set of power supply units (PSUs);
  a set of controlled devices; and
  a supervisor operatively connected to the set of PSUs and the set of controlled devices to:
    receive power supply unit (PSU) power capacity data and PSU power consumption data from each PSU in the set of PSUs;
    receive controlled device power consumption data from the set of controlled devices;
    update a priority table with the controlled device power consumption data received from the set of controlled devices;
    determine whether the PSU power consumption data of any of the PSUs in the set of PSUs exceeds an associated threshold, the associated threshold for each of the PSUs calculated based on the PSU power capacity data for the PSU;
    select one or more controlled devices in the set of controlled devices, wherein the selecting is based on the controlled device power consumption data in the priority table for the set of controlled devices; and
    implement a power response procedure in response to determining the PSU power consumption data of any of the PSUs in the set of PSUs exceeds the associated threshold, the power response procedure including:
      reducing power consumption in at least one of the selected one or more controlled devices and/or in any of the PSUs in the set of PSUs for which the PSU power consumption data exceeds the associated threshold;
      determining power being supplied by the set of PSUs to a first controlled device in the set of controlled devices is going to fail based on the PSU power capacity data and PSU power consumption data received from the set of PSUs;
      sending a message to a network device, wherein the network device does not receive power from any of the PSUs in the set of PSUs and wherein the network device includes a routing table including the first controlled device; and removing, by the network device, the first controlled device from the routing table.

15. The system of claim 14, wherein the supervisor comprises a processor, a controlled device data receiver, a controlled device data transmitter, and a power supply unit (PSU) data receiver.

16. The system of claim 14, wherein each of the controlled devices in the set of controlled devices comprises one of the supervisor, a switch, a router, a line card, a fabric card, an individual port of a line card, a central processing unit (CPU), a system control device (SCD), a network chip, an access point, a computing device, a fan, an optical transceiver, a light emitting device, and a power over Ethernet (PoE) port.

17. The system of claim 14, wherein the supervisor selects the one or more controlled devices in the set of controlled devices in response to determining the PSU power consumption data of any of the PSUs in the set of PSUs exceeds the associated threshold.

18. The system of claim 14, wherein the supervisor, in implementing the power response procedure, sends a message to one of the controlled devices in the set of controlled devices for which power is going to fail as determined by the supervisor based on the PSU power capacity data and PSU power consumption data received from the set of PSUs, and wherein the message causes the one of the controlled devices in the set of controlled devices, in response to receiving the message, to initiate a logging procedure.

19. The system of claim 18, wherein the logging procedure causes the one of the controlled devices in the set of controlled devices to store data associated with the one of the controlled devices in persistent memory.

* * * * *